US011318799B2

(12) United States Patent
Hata et al.

(10) Patent No.: US 11,318,799 B2
(45) Date of Patent: May 3, 2022

(54) PNEUMATIC TIRE

(71) Applicant: The Yokohama Rubber Co., LTD., Tokyo (JP)

(72) Inventors: Hiroshi Hata, Hiratsuka (JP); Hidekazu Ishii, Hiratsuka (JP)

(73) Assignee: The Yokohama Rubber Co., LTD.

( * ) Notice: Subject to any disclaimer, the term of this patent is extended or adjusted under 35 U.S.C. 154(b) by 911 days.

(21) Appl. No.: 15/107,880

(22) PCT Filed: Dec. 24, 2014

(86) PCT No.: PCT/JP2014/084167
§ 371 (c)(1),
(2) Date: Jun. 23, 2016

(87) PCT Pub. No.: WO2015/098972
PCT Pub. Date: Jul. 2, 2015

(65) Prior Publication Data
US 2017/0259626 A1  Sep. 14, 2017

(30) Foreign Application Priority Data

Dec. 26, 2013  (JP) .............................. JP2013-270375

(51) Int. Cl.
*B60C 19/08* (2006.01)
*B60C 11/00* (2006.01)

(52) U.S. Cl.
CPC .......... *B60C 19/086* (2013.01); *B60C 11/005* (2013.01); *B60C 19/082* (2013.01)

(58) Field of Classification Search
CPC ..... B60C 19/08; B60C 19/082; B60C 19/084; B60C 19/086; B60C 11/005

USPC ......................................... 152/152.1, DIG. 2
See application file for complete search history.

(56) References Cited

U.S. PATENT DOCUMENTS 5,910,544 A    6/1999  Ozawa et al.
6,021,830 A *  2/2000  Iwamura ............. B60C 11/0302
                                                  152/209.15
2005/0087275 A1* 4/2005 Zanzig .................. B60C 1/0016
                                                  152/152.1

(Continued)

FOREIGN PATENT DOCUMENTS

EP    2 380 756      10/2011
JP    H03-0169711    7/1991

(Continued)

OTHER PUBLICATIONS

Machine translation of JP2000-016010 (no date).*

(Continued)

*Primary Examiner* — Justin R Fischer
*Assistant Examiner* — Philip N Schwartz
(74) *Attorney, Agent, or Firm* — Thorpe North & Western

(57) ABSTRACT

A pneumatic tire is provided with an electrically conductive portion at least extending continuously from a bead portion to a belt layer. The electrically conductive portion has a linear structure. The linear structure includes an electrically conductive linear member linearly formed of electrically conductive material with an electrical line resistivity of less than $1 \times 10^8$ Ω/cm. The electrically conductive portion ensures an electrically conductive path from the bead portion to the belt layer.

20 Claims, 18 Drawing Sheets

(56) References Cited

U.S. PATENT DOCUMENTS

| | | | |
|---|---|---|---|
| 2005/0103412 A1 | 5/2005 | Zanzig et al. | |
| 2007/0163690 A1* | 7/2007 | Nobuchika et al. | B60C 19/08 152/152.1 |
| 2008/0308203 A1* | 12/2008 | Kunisawa | B60C 19/08 152/152.1 |
| 2011/0259488 A1 | 10/2011 | Zhao et al. | |
| 2013/0092300 A1 | 4/2013 | Kunisawa et al. | |
| 2013/0174951 A1* | 7/2013 | Schunack | D06M 11/74 152/152.1 |
| 2014/0299241 A1 | 10/2014 | Kunisawa et al. | |
| 2015/0158344 A1 | 6/2015 | Kishizoe | |
| 2015/0328941 A1* | 11/2015 | Hirosue | B60C 5/00 152/539 |

FOREIGN PATENT DOCUMENTS

| | | |
|---|---|---|
| JP | H05-041903 U | 6/1993 |
| JP | H06-080001 | 3/1994 |
| JP | H10-025375 | 1/1998 |
| JP | 2000-016010 | 1/2000 |
| JP | 2008-308083 | 12/2008 |
| JP | 2009-154608 | 7/2009 |
| JP | 2013-028195 | 2/2013 |
| JP | 2013-528525 | 7/2013 |
| JP | 2013-193577 | 9/2013 |
| JP | 2013-193579 | 9/2013 |
| JP | 2013-216115 | 10/2013 |
| JP | 2013-237337 | 11/2013 |
| JP | 5344098 | 11/2013 |
| WO | WO 1997/16485 | 5/1997 |
| WO | WO 2011/157473 | 12/2011 |
| WO | WO 2014/049862 | 4/2014 |
| WO | WO 2014/109169 | 7/2014 |

OTHER PUBLICATIONS

Machine translation of JP03-169711 (no date).*

Japanese Office Action for Japanese Patent Application No. 2013-270375 dated Sep. 27, 2016.

International Search Report for International Application No. PCT/JP2014/084167 dated Mar. 31, 2015, 5 pages, Japan.

* cited by examiner

CROSS-SECTIONAL VIEW TAKEN ALONG A

| | Conventional Example | Working Example 1 | Working Example 2 | Working Example 3 | Working Example 4 | Working Example 5 |
|---|---|---|---|---|---|---|
| Volume resistivity of tread cap (Ωcm) | $8.0 \times 10^9$ | $8.0 \times 10^9$ | $8.0 \times 10^9$ | $8.0 \times 10^9$ | $8.0 \times 10^9$ | $8.0 \times 10^9$ |
| Tread cap value of tan δ at 60°C | 0.27 | 0.27 | 0.27 | 0.27 | 0.27 | 0.27 |
| Sidewall rubber volume resistivity (Ωcm) | $7.0 \times 10^9$ | $7.0 \times 10^9$ | $7.0 \times 10^9$ | $7.0 \times 10^9$ | $7.0 \times 10^9$ | $7.0 \times 10^9$ |
| Sidewall rubber value of tan δ at 60°C | 0.22 | 0.22 | 0.22 | 0.22 | 0.22 | 0.22 |
| Innerliner volume resistivity | $5.0 \times 10^9$ | $5.0 \times 10^9$ | $5.0 \times 10^9$ | $5.0 \times 10^9$ | $2.0 \times 10^{11}$ | $2.0 \times 10^{11}$ |
| Earthing tread volume resistivity (Ωcm) | $4.0 \times 10^6$ | $4.0 \times 10^6$ | $4.0 \times 10^6$ | $4.0 \times 10^6$ | $4.0 \times 10^6$ | $4.0 \times 10^6$ |
| Conductive portion location | FIG. 9 | FIG. 16 | FIG. 9 | FIG. 9 | FIG. 9 | FIG. 2 |
| Conductive portion electrical resistivity (Ω/cm) | $1.0 \times 10^7$ | $1.0 \times 10^7$ | $1.0 \times 10^7$ | $1.0 \times 10^7$ | $1.0 \times 10^7$ | $1.0 \times 10^7$ |
| Conductive portion structure | Coating | Blended yarn | Blended yarn | Blended yarn | Blended yarn | Blended yarn |
| Carcass layer coating rubber volume resistivity (Ωcm) | $1.0 \times 10^7$ | $1.0 \times 10^7$ | $1.0 \times 10^7$ | $2.0 \times 10^9$ | $2.0 \times 10^9$ | $2.0 \times 10^9$ |
| Innerliner material | Butyl rubber | Butyl rubber | Butyl rubber | Butyl rubber | Thermoplastic resin | Thermoplastic resin |
| Distance from innerliner to electrically conductive portion (mm) | 1.5 | 1.5 | 1.5 | 1.5 | 1.5 | 1.0 |
| Conductive portion total linear density (dtex) | 450 | 450 | 450 | 450 | 450 | 450 |
| Conductive portion elongation ratio (%) | 10 | 10 | 10 | 10 | 10 | 10 |
| Low rolling resistance | 100 | 100 | 100 | 103 | 106 | 106 |
| Electrostatic suppression performance (when new)(Ω) | $5.0 \times 10^7$ | $5.0 \times 10^7$ | $5.0 \times 10^7$ | $5.0 \times 10^7$ | $5.0 \times 10^7$ | $5.0 \times 10^7$ |
| Electrostatic suppression performance (after traveling)(Ω) | $5.0 \times 10^9$ | $3.0 \times 10^8$ | $5.0 \times 10^7$ | $5.0 \times 10^7$ | $3.0 \times 10^8$ | $9.0 \times 10^7$ |

FIG. 21A

| | Working Example 6 | Working Example 7 | Working Example 8 | Working Example 9 | Working Example 10 |
|---|---|---|---|---|---|
| Volume resistivity of tread cap ($\Omega$cm) | $8.0 \times 10^9$ | $8.0 \times 10^9$ | $8.0 \times 10^9$ | $11 \times 10^{12}$ | $11 \times 10^{12}$ |
| Tread cap value of tan $\delta$ at 60°C | 0.27 | 0.27 | 0.27 | 0.09 | 0.09 |
| Sidewall rubber volume resistivity ($\Omega$cm) | $7.0 \times 10^9$ | $7.0 \times 10^9$ | $7.0 \times 10^9$ | $7.0 \times 10^9$ | $1.0 \times 10^{10}$ |
| Sidewall rubber value of tan $\delta$ at 60°C | 0.22 | 0.22 | 0.22 | 0.22 | 0.12 |
| Innerliner volume resistivity | $2.0 \times 10^{11}$ | $2.0 \times 10^{11}$ | $2.0 \times 10^{11}$ | $2.0 \times 10^{11}$ | $2.0 \times 10^{11}$ |
| Earthing tread volume resistivity ($\Omega$cm) | $4.0 \times 10^6$ | $4.0 \times 10^6$ | $4.0 \times 10^6$ | $4.0 \times 10^6$ | $4.0 \times 10^6$ |
| Conductive portion location | FIG. 2 | FIG. 2 | FIG. 2 | FIG. 2 | FIG. 2 |
| Conductive portion electrical resistivity ($\Omega$/cm) | $1.0 \times 10^7$ | $1.0 \times 10^7$ | $1.0 \times 10^7$ | $1.0 \times 10^7$ | $1.0 \times 10^7$ |
| Conductive portion structure | Blended yarn | Blended yarn | Carbon fiber | Blended yarn | Blended yarn |
| Carcass layer coating rubber volume resistivity ($\Omega$cm) | $2.0 \times 10^9$ | $2.0 \times 10^9$ | $2.0 \times 10^9$ | $2.0 \times 10^9$ | $2.0 \times 10^9$ |
| Innerliner material | Thermoplastic resin | Thermoplastic resin | Thermoplastic resin | Thermoplastic resin | Thermoplastic resin |
| Distance from innerliner to electrically conductive portion (mm) | 0.4 | 0.4 | 0.4 | 0.4 | 0.4 |
| Conductive portion total linear density (dtex) | 450 | 235 | 235 | 235 | 235 |
| Conductive portion elongation ratio (%) | 10 | 10 | 10 | 10 | 10 |
| Low rolling resistance | 106 | 106 | 107 | 121 | 127 |
| Electrostatic suppression performance (when new)($\Omega$) | $5.0 \times 10^7$ | $2.0 \times 10^7$ | $2.0 \times 10^7$ | $2.0 \times 10^7$ | $2.0 \times 10^7$ |
| Electrostatic suppression performance (after traveling)($\Omega$) | $5.0 \times 10^7$ | $2.0 \times 10^7$ | $2.0 \times 10^7$ | $2.0 \times 10^7$ | $2.0 \times 10^7$ |

FIG. 21B

PNEUMATIC TIRE

TECHNICAL FIELD

The present technology relates to a pneumatic tire, and particularly relates to a pneumatic tire with enhanced electrostatic suppression performance.

BACKGROUND ART

Some pneumatic tires employ a structure provided with an earthing tread that suppresses electrostatic charging by discharging to the road surface static electricity produced in the vehicle when traveling. Such an earthing tread is an electrically conductive rubber disposed passing through the tread cap and is exposed to the ground contact surface. This electrostatic suppressing structure can suppress electrostatic charging in the vehicle by discharging static electricity in the vehicle from the belt layer to the road surface via the earthing tread.

However in recent years, the amount of silica contained in rubber compounds constituting tread caps, undertreads, sidewall rubbers, and the like has been increasing for the purpose of improving the fuel economy of tires. Because silica is a good insulator, the resistance value of a tread cap increases when the amount of silica contained therein increases. Consequently, the electrostatic suppression performance decreases.

In order to enhance the electrostatic suppression performance, conventional pneumatic tires provided with an electrically conductive layer extending in a region from a bead portion to the belt layer are known. Examples of conventional pneumatic tires with such a configuration include the technologies disclosed in Japanese Unexamined Patent Application Publication Nos. 2009-154608A and 2013-528525A.

SUMMARY

The present technology provides a pneumatic tire with enhanced electrostatic suppression performance.

A pneumatic tire is provided that comprises:
a pair of bead cores;
at least one carcass layer extending between the pair of bead cores continuously or with a divided portion at a tread portion;
a belt layer disposed outward of the carcass layer in a tire radial direction;
a tread rubber disposed outward of the belt layer in the tire radial direction;
a pair of sidewall rubbers disposed outward of the carcass layer in a tire width direction;
an innerliner disposed on an inner circumferential surface of the carcass layer; and
an electrically conductive portion extending continuously at least from a bead portion to the belt layer; wherein
the electrically conductive portion has a linear structure, the linear structure including an electrically conductive linear member made of a linear electrically conductive material with an electric line resistivity of less than $1 \times 10^8$ $\Omega$/cm.

The pneumatic tire according to the present technology can suppress a reduction in electrical conductivity of the electrically conductive portion caused when the tire is manufactured or in service by the electrically conductive linear member of the electrically conductive portion being linearly formed of electrically conductive material with an electrical line resistivity of less than $1 \times 10^8$ $\Omega$/cm. As a result, there is an advantage that the electrostatic suppression performance of the tire is appropriately secured.

BRIEF DESCRIPTION OF DRAWINGS

FIGS. 21A-21B include a table showing results of performance testing of the pneumatic tires according to embodiments of the technology.

DETAILED DESCRIPTION

The technology is described in detail below, with reference to the accompanying drawings. However, the technology is not limited to the embodiments. In addition, the components of the embodiments include components that are replaceable while maintaining consistency with the technology, and obviously replaceable components. Furthermore, a plurality of modified examples described in the embodiments may be freely combined within the scope of obviousness to a person skilled in the art.

[Pneumatic Tire]

Figure 1:
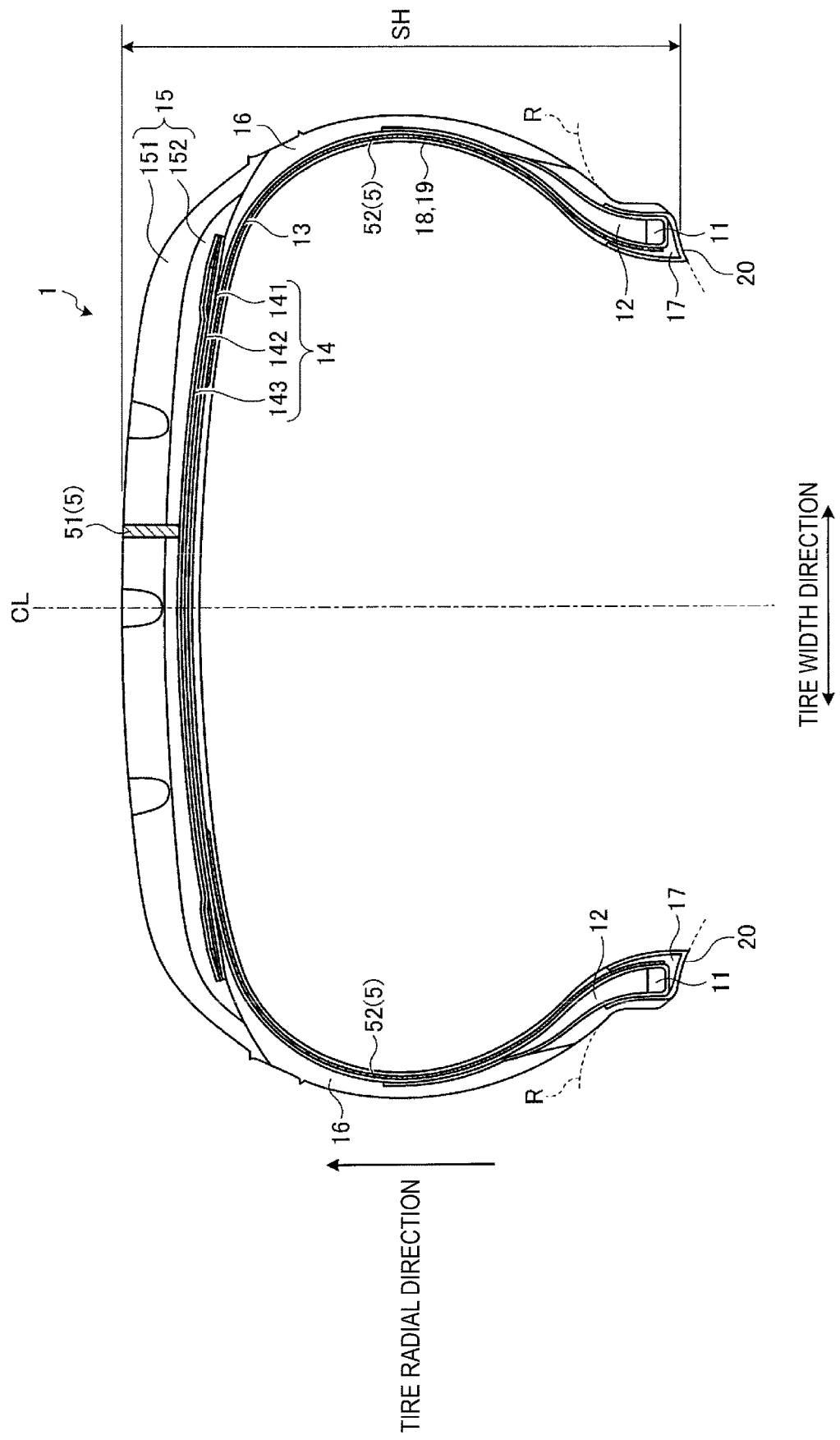
FIG. 1 is a cross-sectional view along a tire meridian direction illustrating a pneumatic tire according to an embodiment of the technology.

FIG. 1 is a cross-sectional view along a tire meridian direction illustrating a pneumatic tire according to an embodiment of the technology. FIG. 1 illustrates a region to one side in the tire radial direction. Also, FIG. 1 illustrates a radial tire for a passenger vehicle as an example of a pneumatic tire.

Note that for FIG. 1, "cross section along a tire meridian direction" refers to a cross section of the tire taken along a plan that includes the tire rotation axis (not illustrated). In addition, the reference sign CL denotes the tire equatorial plane, which is a plane perpendicular to the tire rotation axis that passes through the center point of the tire in the tire rotation axis direction. "Tire width direction" refers to the direction parallel to the tire rotation axis. "Tire radial direction" refers to the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, an innerliner 18, and chafers 20 (see FIG. 1).

The pair of bead cores 11, 11 constitute the cores of the left and right bead portions, and are annular members made of a plurality of bead wires bundled together. The pair of bead fillers 12, 12 are disposed on the outer periphery of the pair of bead cores 11, 11 in the tire radial direction and reinforce the bead portions.

The carcass layer 13 extends between the left and right side bead cores 11, 11 in a toroidal form, forming the framework for the tire. Additionally, both ends of the carcass layer 13 are folded outwardly in the tire width direction so as to wrap around the bead cores 11 and the bead fillers 12, and fixed. The carcass layer 13 is constituted by a plurality of carcass cords formed from steel or organic fibers (e.g. aramid, nylon, polyester, rayon, or the like) covered by a coating rubber and subjected to a rolling process, and has a carcass angle (inclination angle of the fiber direction of the carcass cords with respect to the tire circumferential direction), as an absolute value, from 80 to 95 degrees, both inclusive.

The cord rubber of the carcass cord preferably has a value of tan δ at 60° C. of 0.20 or less. In addition, the cord rubber of the carcass cord preferably has a volume resistivity of $1\times10^8$ Ω·cm or greater. The cord rubber having such a volume resistivity is made using a compound with low exothermic properties and low carbon content, or alternatively by increasing the silica content to improve the volume resistivity. Such a configuration is preferable because a low value of tan δ at 60° C. means low tire rolling resistance.

The value of tan δ at 60° C. is measured using a viscoelasticity spectrometer manufactured by Toyo Seiki Seisaku-sho, Ltd. under the following conditions: 10% initial distortion, ±0.5% amplitude, 20 Hz frequency.

The volume resistivity is measured in accordance with the method specified in JIS (Japanese Industrial Standard) K6271 "Rubber, vulcanized or thermoplastic—Determination of volume and/or surface resistivity". Typically, a member with a volume resistivity of less than $1\times10^8$ Ω·cm can be considered to have electrical conductivity sufficient to suppress a buildup of static electricity.

Note that the configuration illustrated in FIG. 1 includes the carcass layer 13 extending between the left and right bead cores 11, 11 of the tire in a continuous manner.

However, the carcass layer 13 is not limited to such a configuration and may be divided in the tire width direction into a pair of left and right carcass plies, i.e. have a divided carcass structure (not illustrated). Specifically, radially inward end portions of the left-right pair of carcass plies are folded outwardly in the tire width direction so as to wrap around the left and right bead cores 11 and bead filler 12, and fixed. In addition, radially outward end portions of the left-right pair of carcass plies are disposed separated at the center region of the tread portion.

Such a divided carcass structure includes an open section (region without carcass plies) formed at the center region of the tread portion. In such a case, the tension of the tire at this open section is supported by the belt layer 14, and the rigidity at the left and right sidewall portions is ensured by the left and right carcass layers 13, 13. Thus, the tire internal pressure holding capacity and rigidity of the sidewall portions can be maintained, and reduction in tire weight achieved.

The belt layer 14 includes a pair of cross belts 141, 142 and a belt cover 143 layered together, and is disposed around the outer periphery of the carcass layer 13. The pair of cross belts 141, 142 are constituted by a plurality of belt cords formed from steel or organic fibers, covered by coating rubber, and subjected to a rolling process, having a belt angle, as an absolute value, from 20 to 55 degrees, both inclusive. Furthermore, the pair of cross belts 141, 142 have belt angles (inclination angle of the fiber direction of the belt cord with respect to the tire circumferential direction) of opposite signs, and the belts are layered so that the fiber direction of the belt cords intersect each other (cross-ply configuration). The belt cover 143 is configured by a plurality of cords formed from steel or an organic fiber material, covered by coating rubber, and subjected to a rolling process, having a belt angle, as an absolute value, from 0 to 10 degrees, both inclusive. Moreover, the belt cover 143 is disposed outward of the cross belts 141, 142 in the tire radial direction.

The tread rubber 15 is disposed on the outer circumference in the tire radial direction of the carcass layer 13 and the belt layer 14, and configures a tread portion of the tire. The tread rubber 15 includes a tread cap 151 and an undertread 152.

The tread cap 151 is a rubber member that constitutes the ground contact surface and may have a single layer structure (see FIG. 1) or a multi-layer structure (not illustrated). The tread cap 151 preferably has a value of tan δ at 60° C. of 0.25 or less. In addition, the tread cap 151 preferably has a volume resistivity of $1\times10^8$ Ω·cm or greater, more preferably of $1\times10^{10}$ Ω·cm or greater, and even more preferably of $1\times10^{12}$ Ω·cm or greater. The tread cap 151 having such a volume resistivity is made using a compound with low exothermic properties and low carbon content, or alternatively by increasing the silica content to improve the volume resistivity. Such a configuration is preferable because a low value of tan δ at 60° C. means low tire rolling resistance.

The undertread 152 is a member layered inward of the tread cap 151 in the tire radial direction and preferably has a volume resistivity less than that of the tread cap 151.

The pair of sidewall rubbers 16, 16 are disposed outward of the carcass layer 13 in the tire width direction and constitute left and right sidewall portions. The sidewall rubber 16 preferably has a value of tan δ at 60° C. of 0.20 or less. In addition, the sidewall rubber 16 preferably has a resistivity of $1\times10^8$ Ω·cm or greater, more preferably of $1\times10^{10}$ Ω·cm or greater, and even more preferably of $1\times10^{12}$ Ω·cm or greater. The sidewall rubber 16 having such a resistivity is made using a compound with low exothermic properties and low carbon content, or alternatively by increasing the silica content to improve the volume resistivity. Such a configuration is preferable because a low value of tan δ at 60° C. means low tire rolling resistance.

The pair of rim cushion rubbers 17, 17 are disposed inward in the tire radial direction of the left and right bead cores 11, 11 and the folded portion of the carcass layer 13 and constitute the contact surface of the left and right bead portions with the rim flange portion of the rim R. The rim cushion rubber 17 preferably has a resistivity of $1\times10^7$ Ω·cm or less.

Note that the upper limit value for the resistivity of the tread cap 151, the lower limit value for the resistivity of the undertread 152, the upper limit value for the resistivity of the sidewall rubber 16, and the lower limit value for the resistivity of the rim cushion rubber 17 are not particularly limited to the above-mentioned values, but are subject to physical constraints specific to being a rubber member.

The innerliner 18 is an air penetration preventing layer covering the carcass layer 13 disposed on the tire inner surface. The innerliner 18 also suppresses oxidation caused by exposure of the carcass layer 13 and prevents the air in the tire from leaking. In addition, the innerliner 18 is constituted by, for example, a rubber composition with butyl rubber as a main component, thermoplastic resin, thermoplastic elastomer composition made by blending an elastomer component with a thermoplastic resin, and the like. In particular, by using a thermoplastic resin or a thermoplastic elastomer composition to form the innerliner 18, the innerliner 18 can be made thinner than in the case in which butyl rubber is used for the innerliner 18. As such, tire weight can be greatly reduced. Note that the innerliner 18 is typically required to have an air penetration coefficient at of $100\times10^{12}$ cc·cm/cm^2·sec·cmHg or less when measured in accordance with JIS K7126-1 at a temperature of 30° C. In addition, the innerliner 18 preferably has a resistivity of $1\times10^8$ Ω·cm or greater, and typically $1\times10^9$ Ω·cm or greater.

Examples of a rubber composition with butyl rubber as a main component that can be used include butyl rubber (IIR), halogenated butyl rubber (Br-IIR, Cl-IIR), and the like. Butyl rubber is preferably a halogenated butyl rubber such as chlorinated butyl rubber and brominated butyl rubber.

Examples of a thermoplastic resin that can be used include polyamide resins (nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 9T, nylon 6/6T copolymers, nylon 66/PP copolymers, and nylon 66/PPS copolymers); polyester resins (aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); poly(meth)acrylate resins (polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (cellulose acetate and cellulose acetate butyrate); fluorine resins (polyvinylidene fluoride (PVDF), polyvinyl fluoride (PVF), polychlorofluoroethylene (PCTFE), and tetrafluoroethylene/ethylene copolymers (ETFE)); imide resins (aromatic polyimide (PI)); and the like.

Examples of an elastomer that can be used include diene rubbers and hydrogenates thereof (NR (natural rubber), IR (isoprene rubber), epoxidized natural rubber, SBR (styrene butadiene rubber), BR (butadiene rubber) (high-cis BR and low-cis BR), NBR (nitrile rubber), hydrogenated NBR, and hydrogenated SBR); olefin rubbers (ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-containing rubbers (Br-IIR, Cl-IR, brominated copolymer of isobutylene/para-methyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubbers (methyl vinyl silicone rubber, di-methyl silicone rubber, and methyl phenyl vinyl silicone rubber); sulfur-containing rubbers (polysulfide rubber); fluororubbers (vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (styrene elastomers, olefin elastomers, polyester elastomers, urethane elastomers, and polyamide elastomers); and the like.

Electrostatic Suppressing Structure

Some pneumatic tires employ a structure including an earthing tread that suppresses electrostatic charging by discharging to the road surface static electricity produced in the vehicle when traveling. Such an earthing tread is an electrically conductive rubber disposed passing through the tread cap and is exposed to the ground contact surface. This electrostatic suppressing structure can suppress electrostatic charging in the vehicle by discharging static electricity in the vehicle from the belt layer to the road surface via the earthing tread.

However in recent years, as described above, the amount of silica contained in rubber compounds constituting tread caps, undertreads, sidewall rubber, and the like has been increasing in order to reduce the tire rolling resistance and thus improve the fuel economy of tires. Because silica is a good insulator, the resistance value of a tread cap increases when the amount of silica contained therein increases. Consequently, the electrostatic suppression performance decreases.

In light of the above, the pneumatic tire 1 employs the following configuration to enhance the electrostatic suppression performance.

Figure 2:
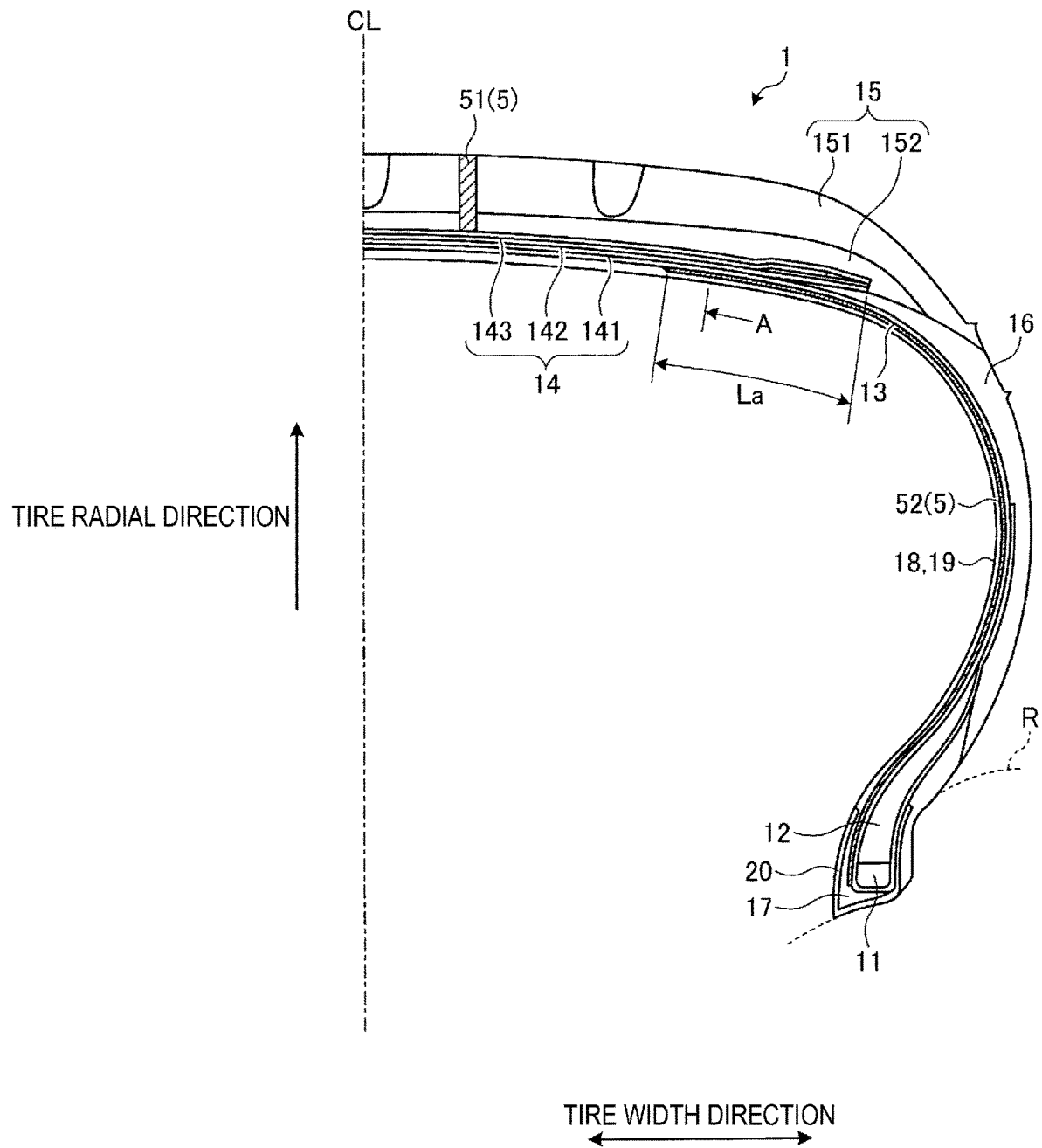
FIG. 2 is an explanatory diagram illustrating an electrostatic suppressing structure of the pneumatic tire illustrated in FIG. 1.
Figure 3:
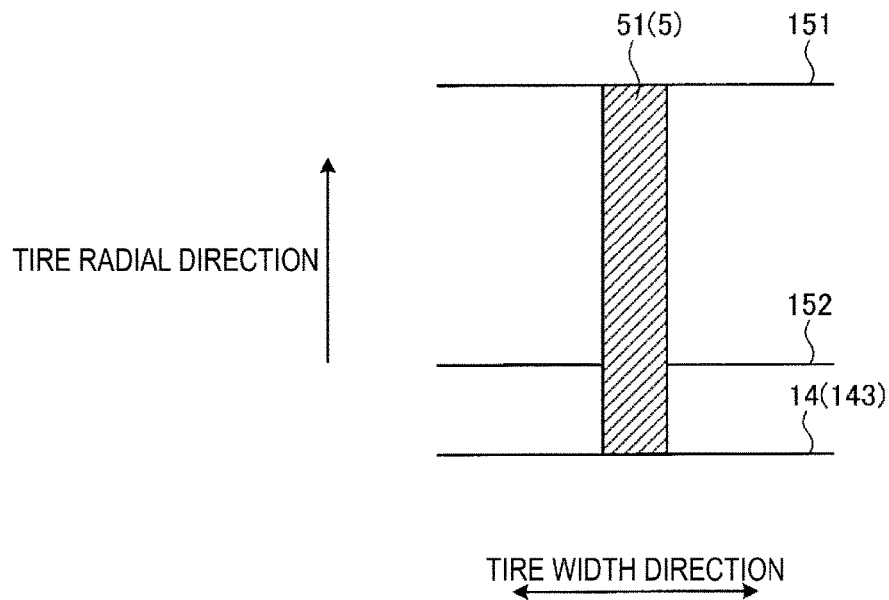
FIG. 3 is an explanatory diagram illustrating the electrostatic suppressing structure of the pneumatic tire illustrated in FIG. 1.
Figure 4:
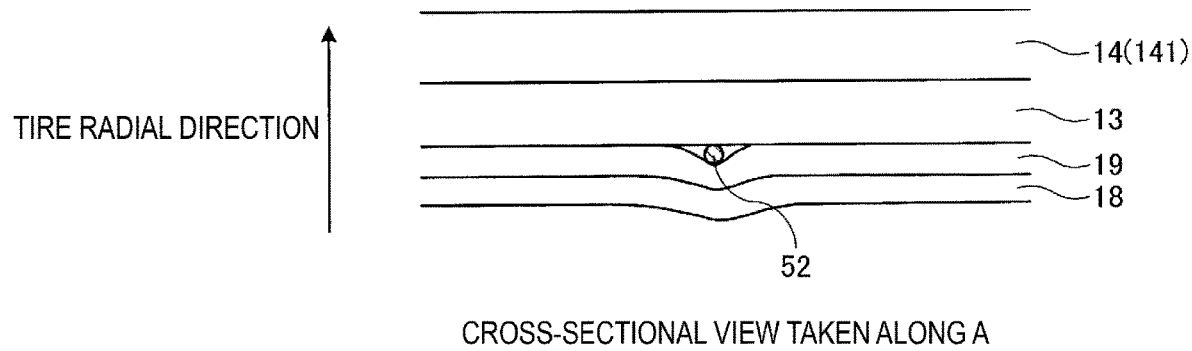
FIG. 4 is an explanatory diagram illustrating the electrostatic suppressing structure of the pneumatic tire illustrated in FIG. 1.
Figure 5:
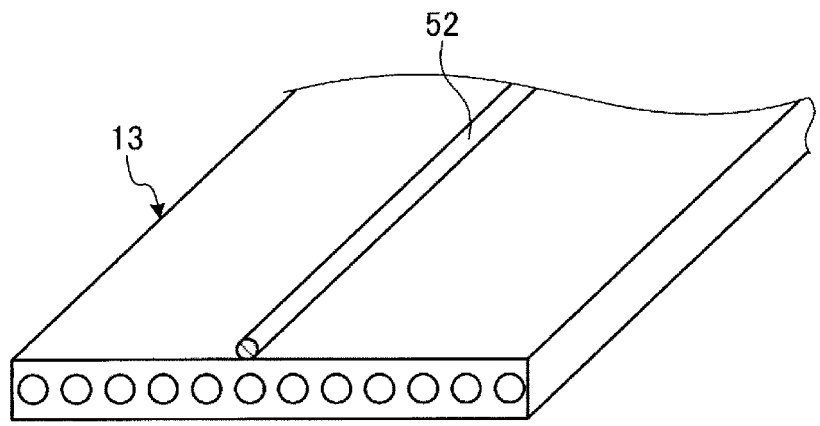
FIG. 5 is an explanatory diagram illustrating the electrostatic suppressing structure of the pneumatic tire illustrated in FIG. 1.
Figure 6:
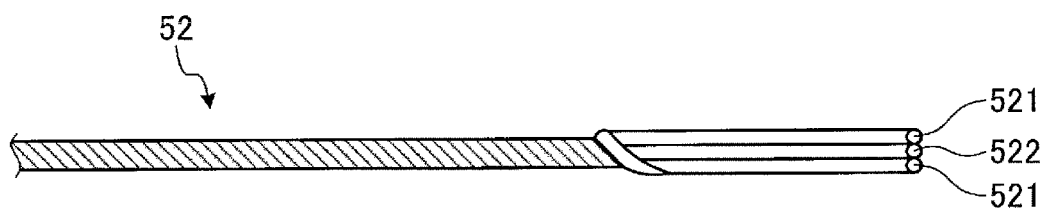
FIG. 6 is an explanatory diagram illustrating the electrostatic suppressing structure of the pneumatic tire illustrated in FIG. 1.

FIGS. 2 to 6 are explanatory diagrams of an electrostatic suppressing structure of the pneumatic tire illustrated in FIG. 1. FIG. 2 is a cross-sectional view in a tire meridian direction of the region to one side of the tire equatorial plane CL. FIG. 3 is an enlarged cross-sectional view of an earthing tread 51. FIG. 4 is a cross-sectional view taken along A of FIG. 2. A layered structure of an electrically conductive portion 52, the carcass layer 13, the innerliner 18, and a tie rubber 19 is illustrated. FIG. 5 schematically illustrates the region where the electrically conductive portion 52 is disposed in the tire circumferential direction. In these drawings, the electrically conductive portion 52 is indicated by hatching. FIG. 6 illustrates the stranded wire structure of the electrically conductive portion 52.

As illustrated in FIG. 1, the pneumatic tire 1 is provided with the earthing tread 51 and the electrically conductive portion 52 as an electrostatic suppressing structure 5.

As illustrated in FIG. 2 and FIG. 3, the earthing tread 51 is disposed passing through the tread cap 151 and undertread 152, is exposed to the road contact surface of the tread rubber 15, and is in contact with the belt layer 14 (belt cover 143) in an electrically conductive manner. Consequently, an electrically conductive path is secured from the belt layer 14 to the road surface. In addition, the earthing tread 51 has an annular structure extending around the entire circumference of the tire. A portion of the earthing tread 51 is exposed to the tread road contact surface and extends continuously in the tire circumferential direction. As such, when the tire is driven, an electrically conductive path from the belt layer 14 to the road surface is always ensured by the earthing tread 51 being always in contact with the road surface.

In addition, the earthing tread 51 is made of electrically conductive rubber material having a lower volume resistivity than the tread rubber 15. Specifically, the earthing tread 51 preferably has a volume resistivity of less than $1\times10^8$ Ω·cm, and more preferably of $1\times10^6$ Ω·cm or less.

The electrically conductive portion 52 extends at least from the bead portion to the belt layer 14, as illustrated in FIG. 1 and FIG. 2, and has an electrical line resistivity of less than $1\times10^8$ Ω/cm. At least one electrically conductive portion 52 is disposed. As a result, an electrically conductive path is ensured from the bead portion to the belt layer 14.

"Bead portion" refers to the region from the rim diameter measuring position to a position at one third of the cross-sectional height SH of the tire.

"Cross-sectional height SH of the tire" refers to a height half of the difference between the tire external diameter and the rim diameter, and measured when the tire is assembled on a specified rim, inflated to a specified inner pressure, and no load is applied.

Here, "specified rim" refers to an "applicable rim" as defined by the Japan Automobile Tyre Manufacturers Association (JATMA), to a "Design Rim" as defined by the Tire and Rim Association (TRA), or to a "Measuring Rim" defined by the European Tyre and Rim Technical Organization (ETRTO). In addition, "specified internal pressure" refers to "maximum air pressure" as defined by JATMA, to a maximum value in "TIRE LOAD LIMITS AT VARIOUS COLD INFLATION PRESSURES" as defined by TRA, and to "INFLATION PRESSURES" as defined by ETRTO. Also, "specified load" refers to a "maximum load capacity" defined by JATMA, to a maximum value in "TIRE LOAD LIMITS AT VARIOUS COLD INFLATION PRESSURES" as defined by TRA, and to a "LOAD CAPACITY" as defined by ETRTO. However, according to JATMA, for a passenger vehicle tire, the specified internal pressure is an air pressure of 180 kPa, and a specified load is 88% of maximum load capacity.

As illustrated in FIGS. 4 to 6, the electrically conductive portion 52 has a linear structure and includes an electrically conductive linear member 521. The electrically conductive portion 52 may have a stranded wire structure including an intertwined plurality of linear members including at least one electrically conductive linear member 521 (see FIG. 6), or may be a monofilament cord made of electrically conductive material (not illustrated). An electrically conductive portion 52 with a linear structure is preferable because tire rolling resistance is reduced more than a configuration in which an electrically conductive portion is constituted by a rubber layer additionally added to the tire.

The electrically conductive linear member 521 is a linear member made of electrically conductive material linearly formed and has an electrical line resistivity of less than $1\times10^8$ Ω/cm. The electrically conductive linear member 521 may represent a monofilament, a strand, or a cord made of electrically conductive material. Accordingly, for example, the electrically conductive linear member 521 may correspond to a cord made of metal or carbon fiber, a metal fiber of fiberized metal such as stainless steel, and the like. However, the electrically conductive linear member 521 does not correspond to a non-electrically conductive linear member made of non-electrically conductive material with an electrical line resistivity of $1\times10^8$ Ω/cm or greater, a linear member made of such a non-electrically conductive linear member with its surface coated with electrically conductive material, or the like.

Examples of the stranded wire structure of the electrically conductive portion 52 (see FIG. 6) include:

(1) an intertwined plurality of carbon fibers;

(2) an electrically conductive linear member 521 with an electrical line resistivity of less than $1\times10^8$ Ω/cm and a non-electrically conductive linear member 522 with an electrical line resistivity of $1\times10^8$ Ω/cm or greater intertwined together. The stranded wire structure of the linear members is not limited to any particular structure, and any structure can be applied.

As the non-electrically conductive linear member 522 of above-mentioned (2), for example polyester fiber, nylon fiber, and the like can be used. In particular, the electrically conductive portion 52 is preferably a blended yarn of the electrically conductive linear member 521 made of metal fiber and the non-electrically conductive linear member 522 made of polyester fiber intertwined together.

The electrical line resistivity Ω/cm is measured by:

preparing a sample piece of the fiber 3 cm or greater in length in the filament length direction;

applying a voltage of 500 V across the sample piece (between both ends);

carrying out measurement using ohmmeter SME-8220 manufactured by Toa Dempa Kogyo K.K under conditions of measurement environment temperature 20° C. and 20% RH.

The electrically conductive portion 52 preferably has a total linear density from 20 to 1000 dtex, both inclusive, and more preferably from 150 to 350 dtex, both inclusive. Setting this lower limit of the total linear density to a value within the range described above ensures that the electrically conductive portion 52 is prevented from breaking when the tire is manufactured. In addition, setting this upper limit of total linear density to a value within the range described above ensures that the electrically conductive portion 52 is prevented from breaking when the tire is driven.

The total linear density is measured in accordance with JIS L 1017-8.3 "Test methods for chemical fibre tire cords—Fineness based on corrected weight".

The electrically conductive portion 52 preferably has an elongation ratio of from 1.0 to 70.0%, both inclusive. Setting this lower limit of the elongation ratio to a value within the range described above ensures that the electrically conductive portion 52 is prevented from breaking when the tire is manufactured. In addition, setting this upper limit of the elongation ratio to a value within the range described above ensures that the electrically conductive portion 52 is prevented from breaking when the tire is driven.

The elongation ratio of the linear members is measured in accordance with JIS L 1017-8.5 "Test methods for chemical fibre tire cords—Tensile strength and Elongation ratio".

In the configuration illustrated in FIG. 1 for example, the electrically conductive portion 52 is disposed in each of the regions to the left and the right of the tire equatorial plane CL. In addition, in each region, a plurality of the electrically conductive portions 52 are disposed at predetermined intervals in the tire circumferential direction.

As illustrated in FIG. 2, the electrically conductive portion 52 extends continuously in the tire radial direction along the carcass layer 13 from the bead portion to the belt layer 14. The radially inward end portion of the electrically conductive portion 52 is located in the vicinity of the bead core 11 in contact with the rim cushion rubber 17. Consequently, an electrically conductive path is ensured from the rim fitting surface to the electrically conductive portion 52 via the rim cushion rubber 17. In addition, the radially outward end portion of the electrically conductive portion 52 extends to a position at which the end portion overlaps with the belt layer 14 in the tire width direction. As a result, an electrically conductive path is ensured from the electrically conductive portion 52 to the belt layer 14.

In such a case, a lap width La with which the belt layer 14 and the electrically conductive portion 52 overlap is preferably 3 mm or greater. The upper limit of the lap width La is not particularly limited to any value, and the electrically conductive portion 52 may extend, crossing the tire equatorial plane CL, to reach both left and right bead portions.

The lap width La, in a cross-sectional view in the tire meridian direction, is taken as the surface length of the electrically conductive portion 52. This surface length of the electrically conductive portion 52 is measured from the bottom point of a vertical line drawn from the laterally outward end portion of belt ply 141, which is the widest belt ply in the belt layer 14, to the conductive portion 52 to the end portion of the electrically conductive portion 52.

The electrically conductive portion 52 of the configuration illustrated in FIG. 1 is yarn, and this electrically conductive portion 52 is disposed between the carcass layer 13 and the adjacent member. As illustrated in FIG. 6, the electrically conductive portion 52 has a stranded wire structure including the electrically conductive linear member 521 with an electrical line resistivity of less than $1 \times 10^8$ Ω/cm and the non-electrically conductive linear member 522 with an electrical line resistivity of $1 \times 10^8$ Ω/cm or greater intertwined together.

The yarn is a linear member disposed along the surface of the carcass layer 13 (see FIG. 5). Upon forming of the green tire, this yarn forms a gap between the carcass layer 13 and the adjacent member for discharging enclosed air.

For example, the electrically conductive portion 52 of the configuration illustrated in FIG. 1 is located on the inner circumferential surface side of the carcass layer 13 and disposed between the carcass layer 13 and the innerliner 18 and the tie rubber 19, as illustrated in FIG. 2 and FIG. 4. The electrically conductive portion 52 extends in a straight line along the carcass layer 13 in the tire radial direction.

In such a case, the distance from the electrically conductive portion 52 to the innerliner 18 is preferably 1.0 mm or less, and more preferably 0.5 mm or less. In particular, when the innerliner 18 is constituted by thermoplastic resin, static electricity is produced by friction when the tire is driven and the innerliner 18 builds up charge. Thus, by disposing the electrically conductive portion 52 approximate to the innerliner 18, an electrically conductive path from the innerliner 18 to the electrically conductive portion 52 is appropriately ensured.

The configuration described above discharges static electricity produced in the vehicle through the rim R, the rim cushion rubber 17, the electrically conductive portion 52, and the belt layer 14 (and undertread 152) to the road surface via the earthing tread 51. Thus, electrostatic charge in the vehicle due to static electricity is suppressed.

Note that the rim cushion rubber 17, the coating rubber of the carcass layer 13 and the belt layer 14 constitute the electrically conductive path from the rim R to the earthing tread 51. Thus, these rubbers preferably have low volume resistivity. This causes the electrically conductive efficiency from the rim R to the earthing tread 51 to be improved.

MODIFIED EXAMPLES

Figure 7:
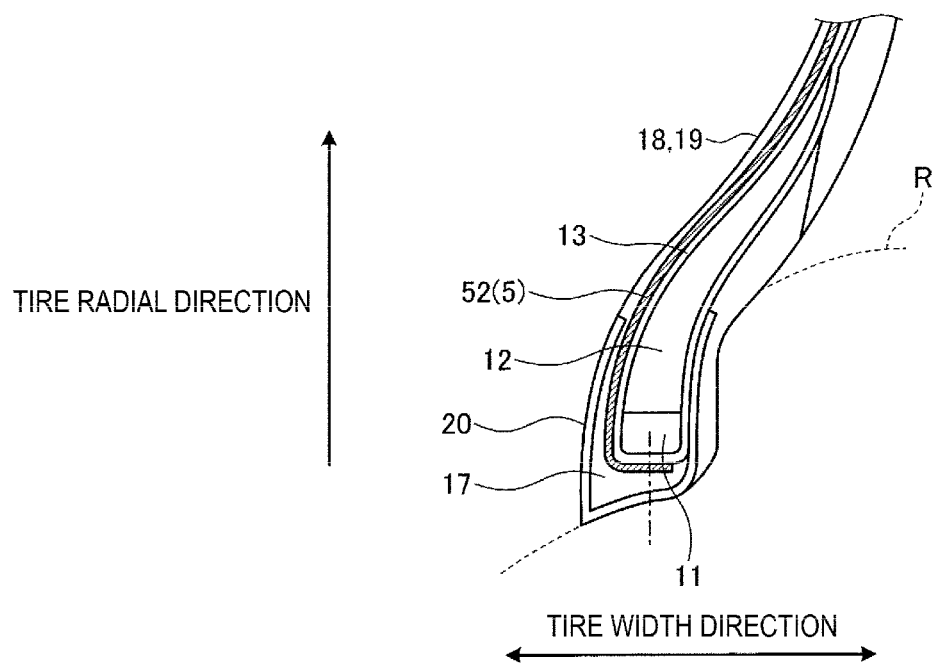
FIG. 7 is an explanatory diagram illustrating a modified example of the pneumatic tire illustrated in FIG. 1.
Figure 8:
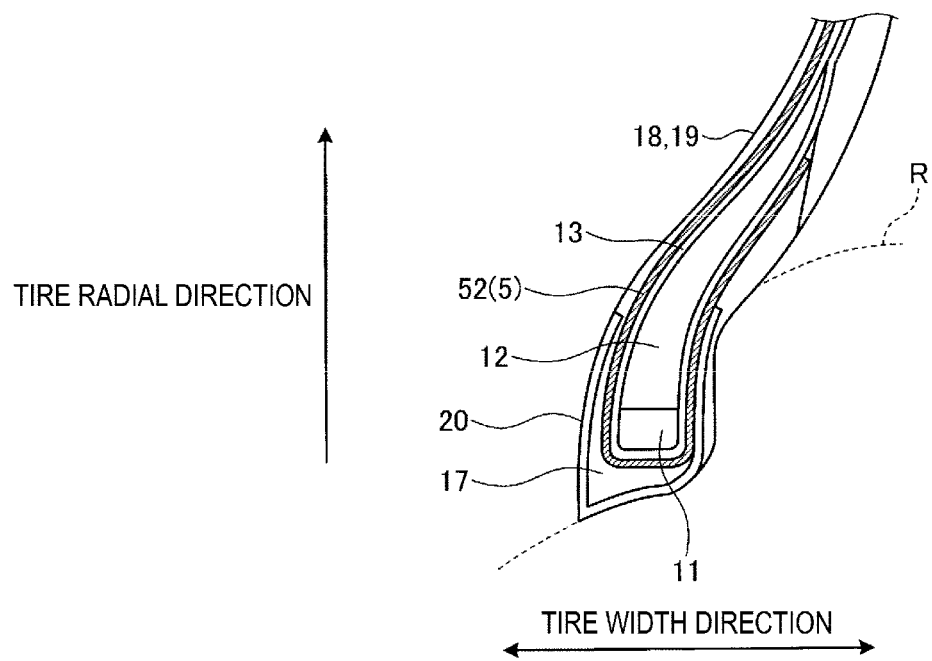
FIG. 8 is an explanatory diagram illustrating a modified example of the pneumatic tire illustrated in FIG. 1.

FIG. 7 and FIG. 8 are explanatory diagrams illustrating modified examples for the pneumatic tire illustrated in FIG. 1. These diagrams illustrate modified examples of the structure with which the electrically conductive portion 52 is disposed.

The electrically conductive portion 52 of the configuration illustrated in FIG. 1, as illustrated in FIG. 2, includes a radially inward end portion that extends to the vicinity of the bead core 11 and is in contact with the rim cushion rubber 17. Such a configuration is preferable because an electrically conductive path from the rim fitting surface to the electrically conductive portion 52, via the rim cushion rubber 17, is appropriately ensured.

In addition, as illustrated in FIG. 7, the radially inward end portion of the electrically conductive portion 52 may extend to the inner side of the bead core 11 in the tire radial direction. As illustrated in FIG. 8, the radially inward end portion of the electrically conductive portion 52 may be disposed to wind up and around the bead core 11. These configurations further improve electrical conductivity from the rim fitting surface to the electrically conductive portion 52.

However, the electrically conductive portion 52 is not limited to these configurations, and the radially inward end portion of the electrically conductive portion 52 may, for example, end in the vicinity of the bead filler 12 without coming into contact with the rim cushion rubber 17 (not illustrated). Such a configuration can ensure necessary and sufficient electrical conductivity from the rim fitting surface to the electrically conductive portion 52.

Figure 9:
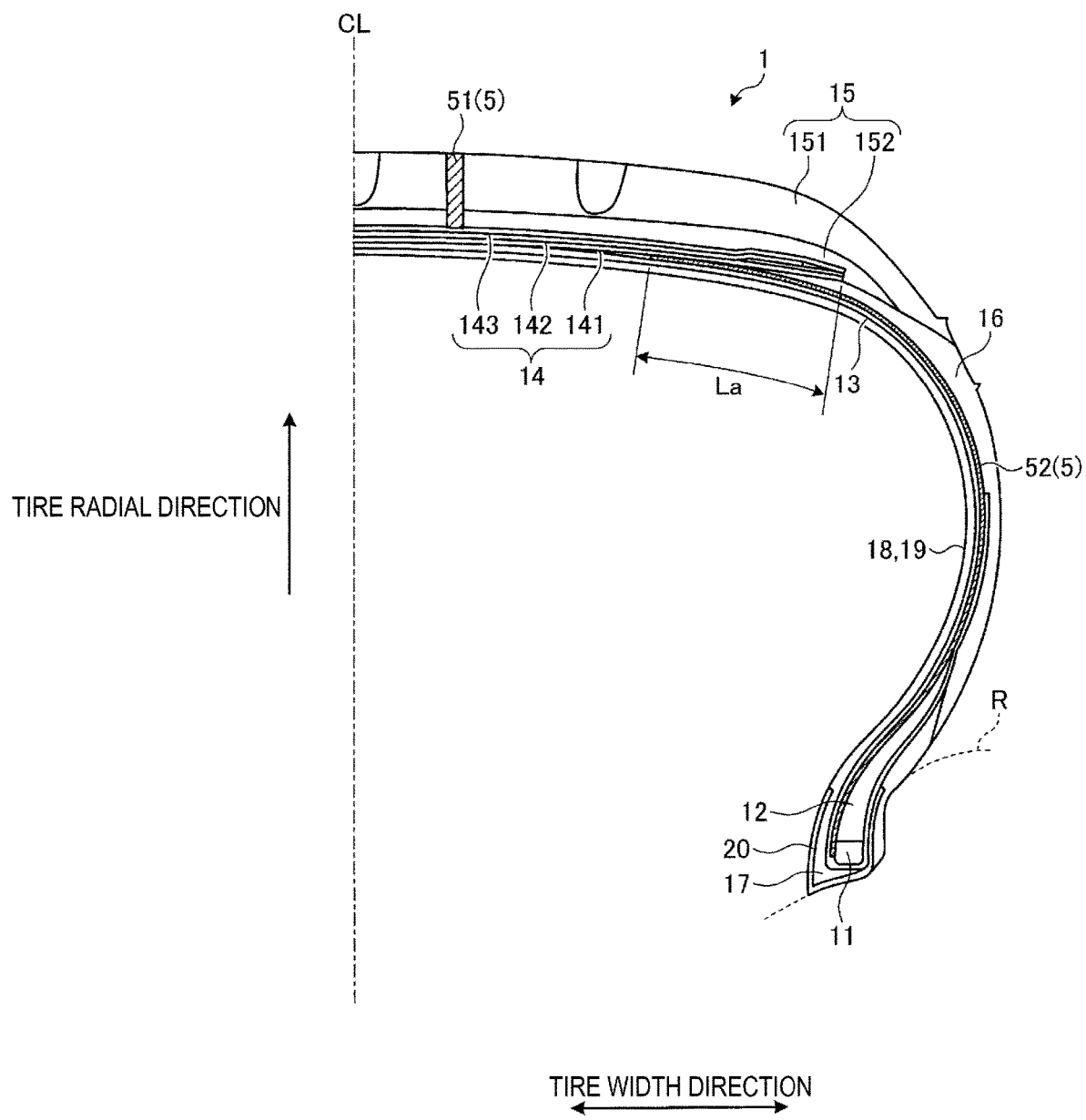
FIG. 9 is an explanatory diagram illustrating a modified example of the pneumatic tire illustrated in FIG. 1.
Figure 10:
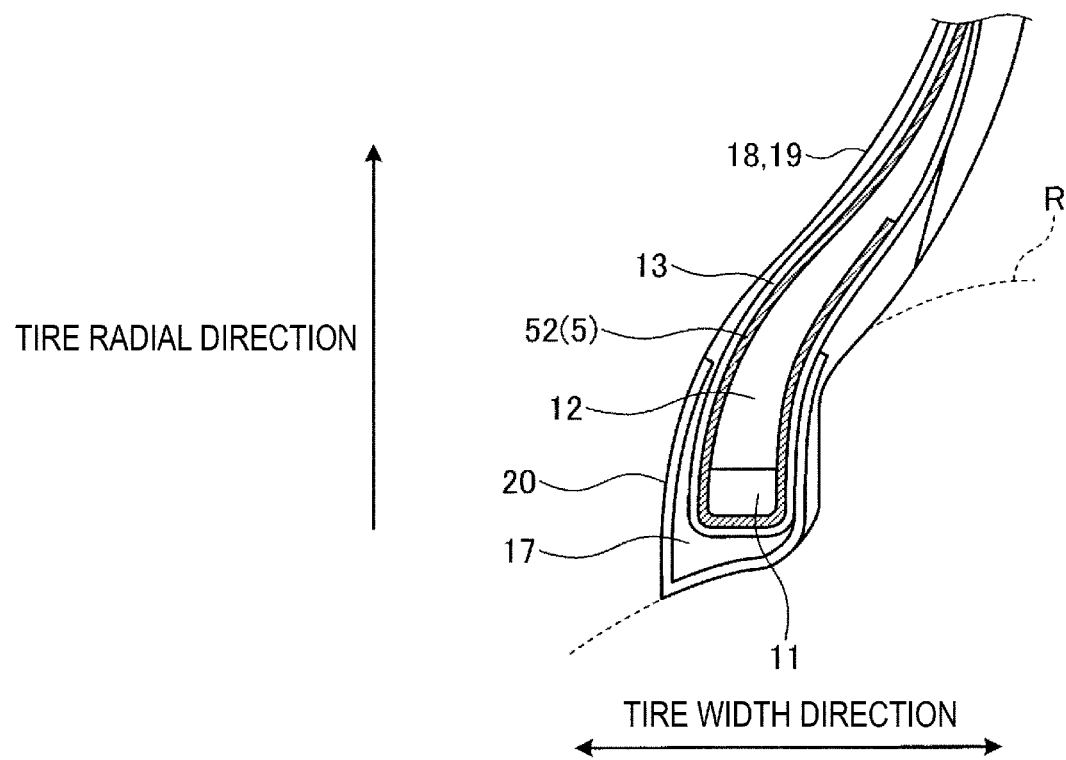
FIG. 10 is an explanatory diagram illustrating a modified example of the pneumatic tire illustrated in FIG. 1.

FIG. 9 and FIG. 10 are explanatory diagrams illustrating modified examples for the pneumatic tire illustrated in FIG. 1. These diagrams illustrate modified examples of the structure with which the electrically conductive portion 52 is disposed.

The electrically conductive portion 52 of the configuration illustrated in FIG. 1, as illustrated in FIG. 2 and FIG. 4, is disposed on the inner circumference of the carcass layer 13 between the carcass layer 13 and the innerliner 18 and the tie rubber 19. Such a configuration can reduce the distance from the innerliner 18 to the electrically conductive portion 52. Specifically, the distance from the electrically conductive portion 52 to the innerliner 18 can be reduced to 1.0 mm or less. This configuration is preferable, in particular when the innerliner 18 is made of thermoplastic resin, because static electricity produced in the innerliner 18 can efficiently dissipate through the electrically conductive portion 52.

However the electrically conductive portion 52 is not limited to such a configuration and, as illustrated in FIG. 9 and FIG. 10, may be disposed on the outer circumference of the carcass layer 13.

For example, the electrically conductive portion 52 of the configuration illustrated in FIG. 9 and FIG. 10 is yarn for discharging air enclosed upon forming of the green tire. This electrically conductive portion 52 has a stranded wire structure including a plurality of linear members intertwined together, the plurality of linear members including an electrically conductive linear member (see FIG. 6). In addition, the electrically conductive portion 52 is disposed along the outer circumferential surface of the carcass layer 13 (see FIG. 5) and extends from the bead portion to the belt layer 14. The radially outward end portion of the electrically conductive portion 52 extends to a position at which the end portion overlaps the belt layer 14 and is disposed between the belt layer 14 (the most radially inward belt ply 141 (see FIG. 9)) and the carcass layer 13.

In such a case, the radially inward end portion of the electrically conductive portion 52 may be located inward of the bead core 11 or the bead filler 12 in the tire width direction (see FIG. 9). The radially inward end portion may also be located inward of the bead core 11 in the radial direction (not illustrated). Additionally, the radially inward end portion may wrap up and around the bead core 11 together with the carcass layer 13 (see FIG. 10).

Figure 11:
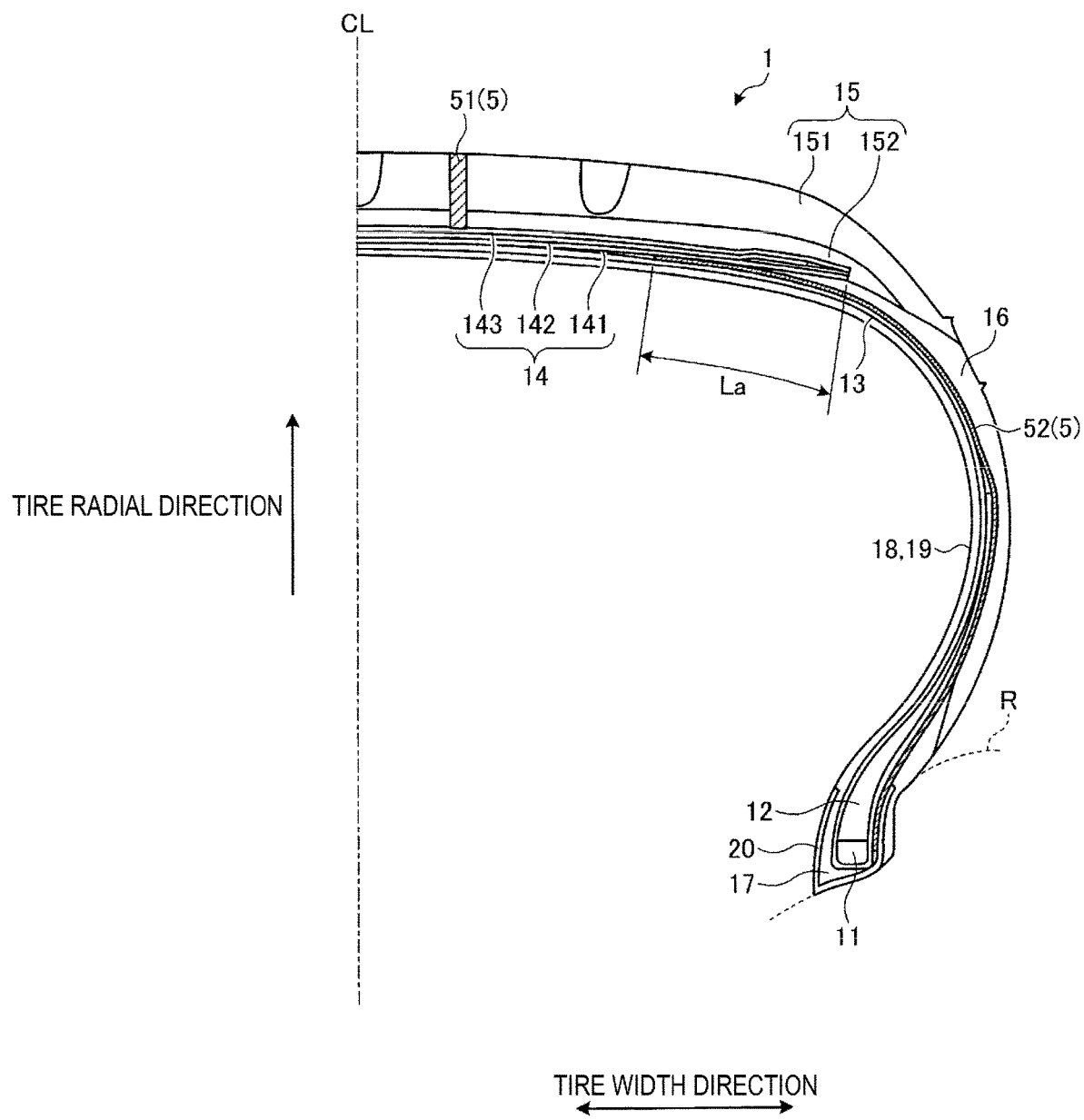
FIG. 11 is an explanatory diagram illustrating a modified example of the pneumatic tire illustrated in FIG. 1.
Figure 12:
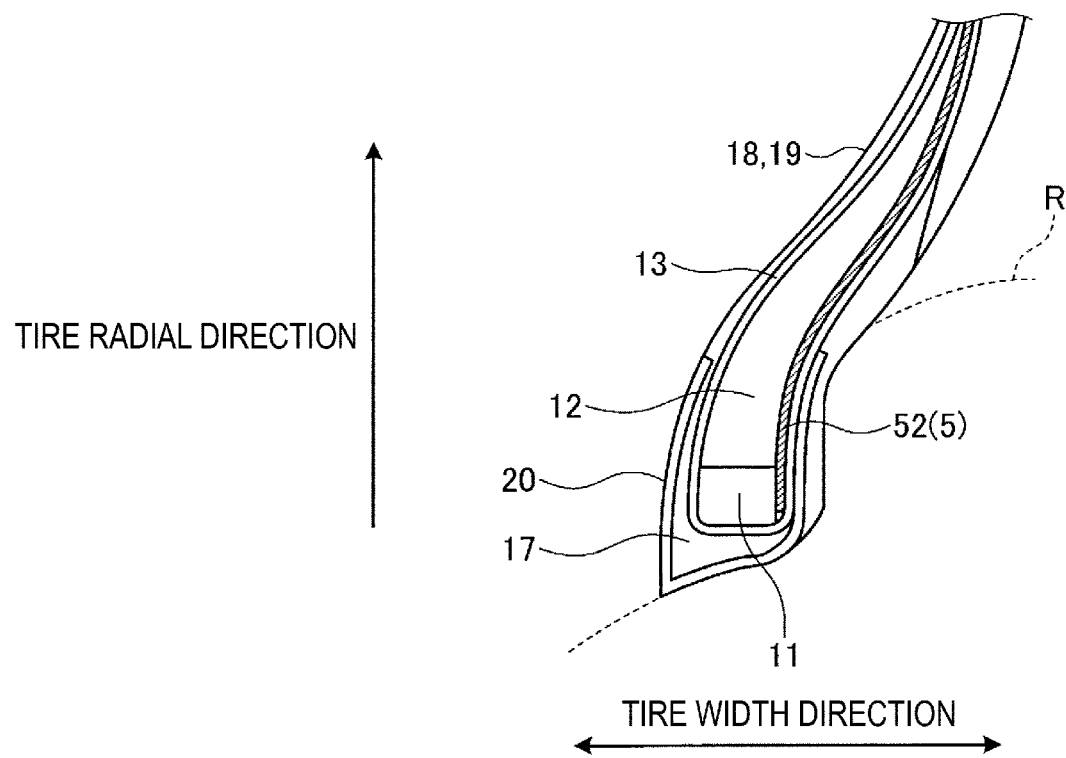
FIG. 12 is an explanatory diagram illustrating a modified example of the pneumatic tire illustrated in FIG. 1.

FIG. 11 and FIG. 12 are explanatory diagrams illustrating modified examples for the pneumatic tire illustrated in FIG. 1. These diagrams illustrate modified examples of the structure with which the electrically conductive portion 52 is disposed.

As described above, the electrically conductive portion 52 of the configuration illustrated in FIG. 1 is a yarn for discharging air enclosed upon forming of the green tire and, as illustrated in FIG. 5, is disposed along the circumferential surface of the carcass layer 13.

However the electrically conductive portion 52 is not limited to this configuration. The electrically conductive portion 52 may be a member that is not a yarn and may be disposed with a portion or the entirety thereof separated from the carcass layer 13.

For example, the electrically conductive portion 52 of the configuration illustrated in FIG. 11 and FIG. 12 is disposed between the bead core 11 and the bead filler 12 and the sidewall rubber 16 and extends from the bead portion to the belt layer 14. The radially outward end portion of the electrically conductive portion 52 extends to a position at which the end portion overlaps the belt layer 14 and is disposed between the belt layer 14 (the most radially inward belt ply 141 (see FIG. 11)) and the carcass layer 13.

In addition, in the configuration illustrated in FIG. 11, the radially inward end portion of the electrically conductive portion 52 is disposed between the wound up portion of the carcass layer 13 and the sidewall rubber 16 and is in contact with the rim cushion rubber 17. By the electrically conductive portion 52 and the rim cushion rubber 17 being in contact in such a manner, the electrical conductivity from the rim fitting surface to the electrically conductive portion 52 is improved.

In the configuration illustrated in FIG. 12, the radially inward end portion of the electrically conductive portion 52 is disposed between the bead core 11 and bead filler 12 and the wound up portion of the carcass layer 13. Such a configuration can ensure an electrically conductive path from the rim cushion rubber 17 to the electrically conductive portion 52 via the cord rubber of the carcass layer 13.

FIGS. 13 to 16 are explanatory diagrams illustrating modified examples of the pneumatic tire illustrated in FIG. 1. These diagrams illustrate modified examples of the structure with which the electrically conductive portion 52 is disposed.

The electrically conductive portion 52 of the configuration illustrated in FIG. 1 is embedded in the tire without being exposed to the tire surface. Such a configuration is preferable because the electrically conductive portion 52 is not prone to breaking when the tire is manufactured or in service.

However, the electrically conductive portion 52 is not limited to this configuration and may be disposed exposed to the tire inner circumferential surface or the tire outer circumferential surface.

Figure 13:
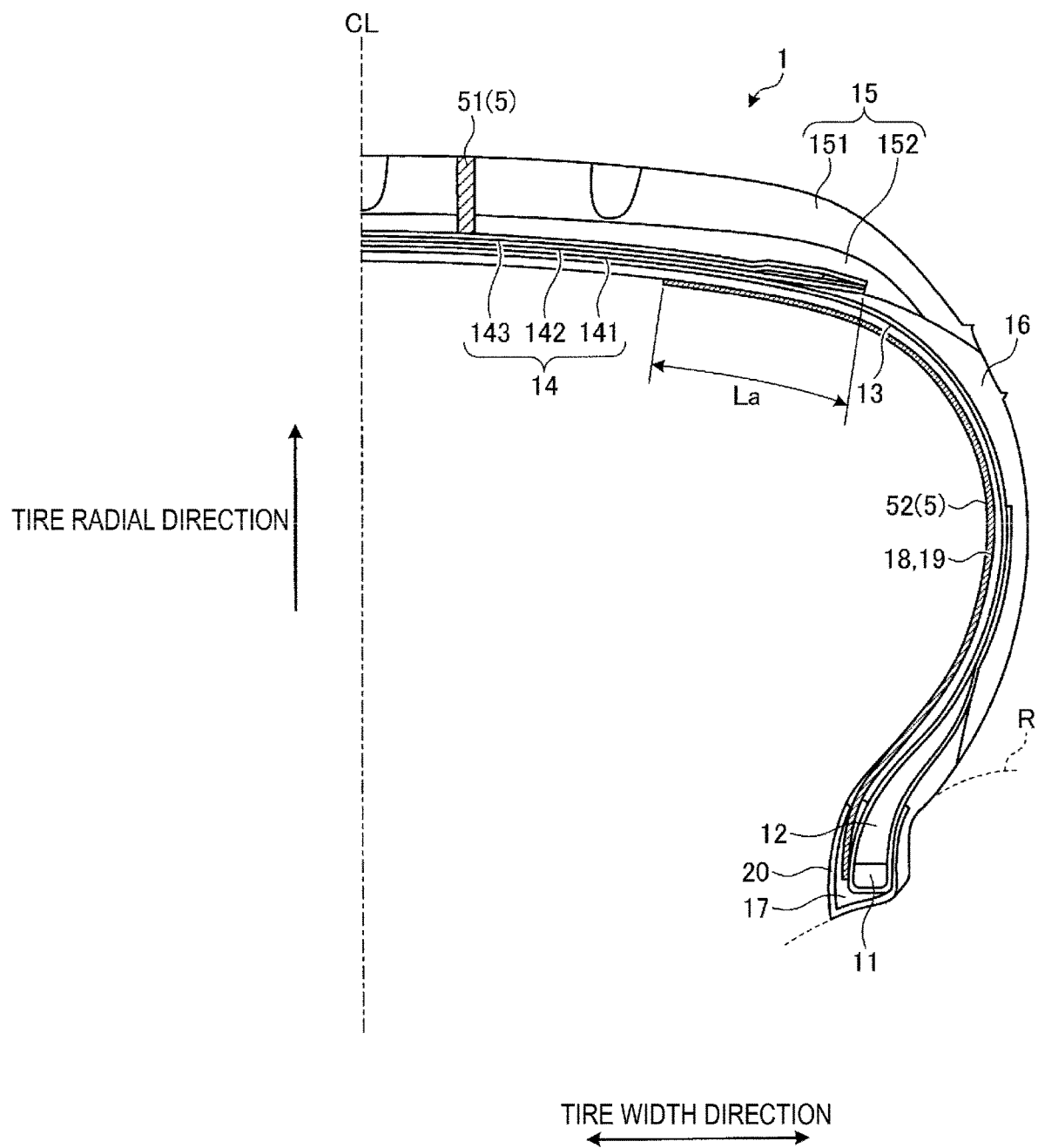
FIG. 13 is an explanatory diagram illustrating a modified example of the pneumatic tire illustrated in FIG. 1.
Figure 14:
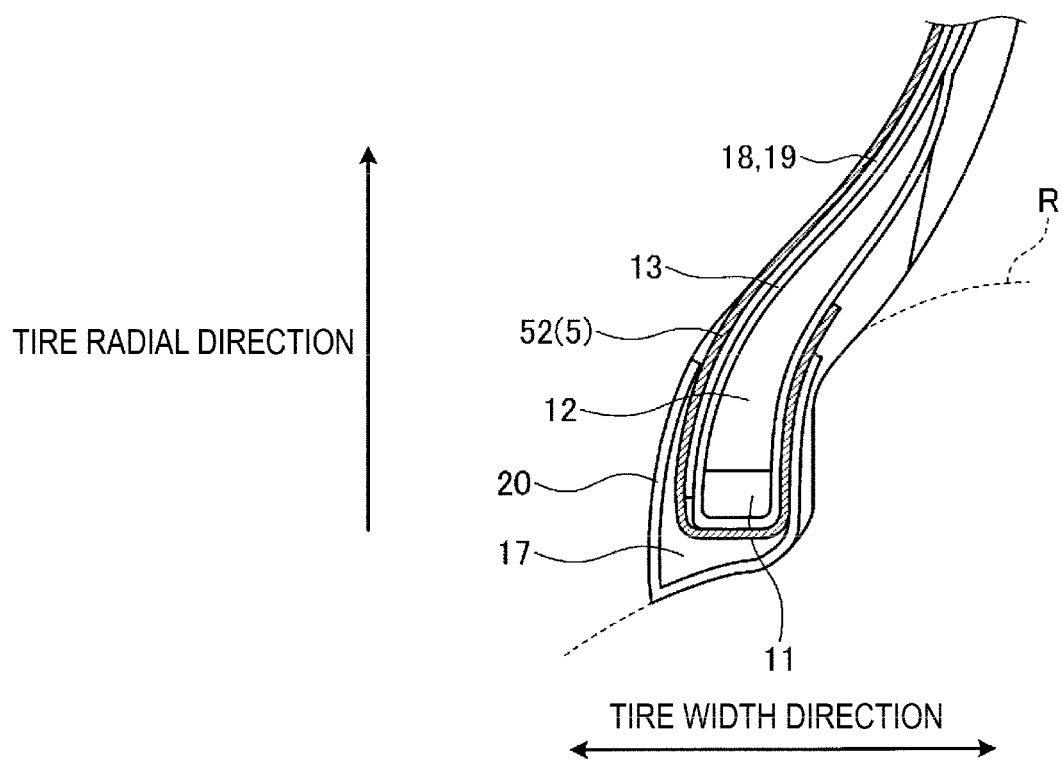
FIG. 14 is an explanatory diagram illustrating a modified example of the pneumatic tire illustrated in FIG. 1.
Figure 15:
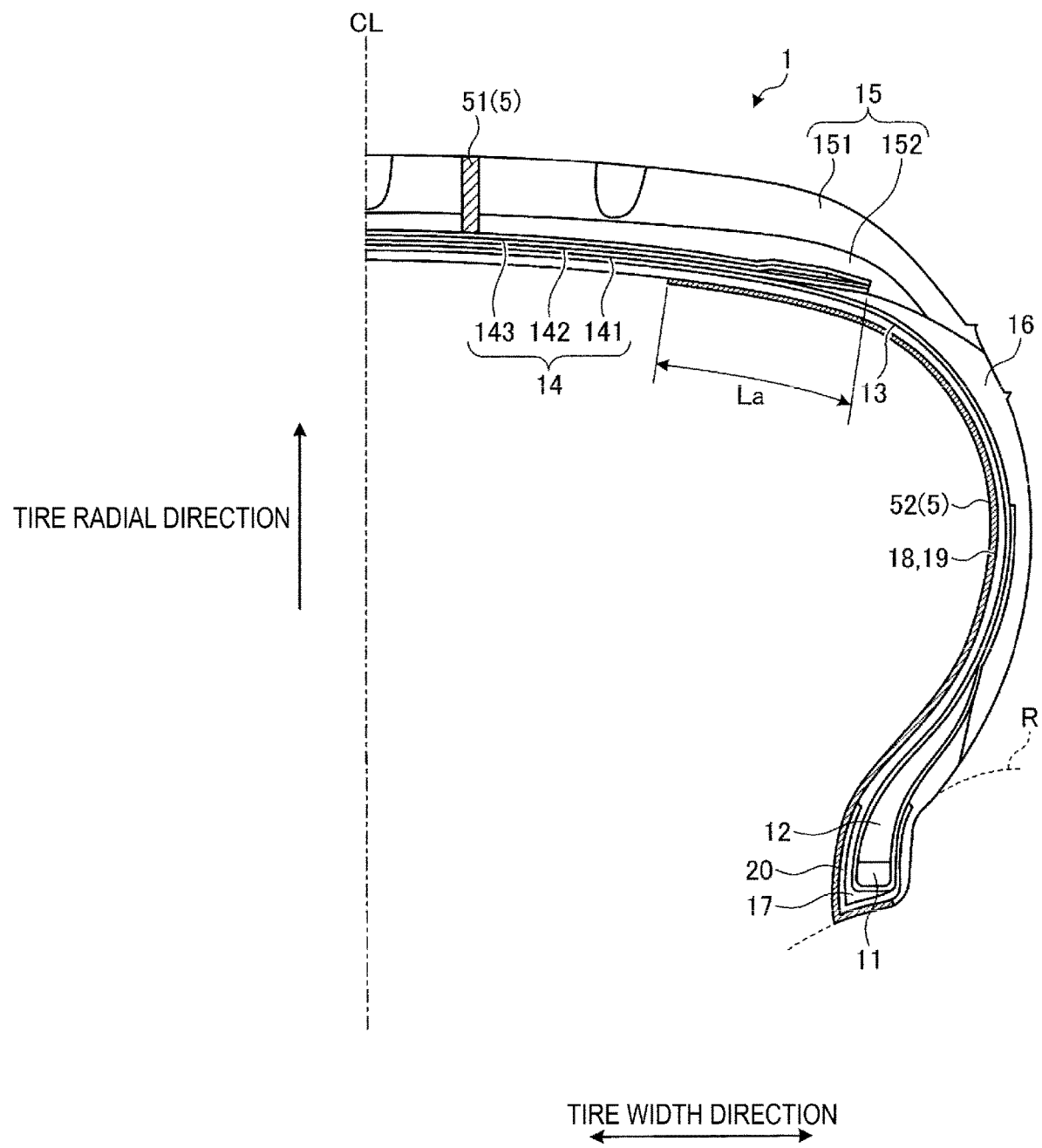
FIG. 15 is an explanatory diagram illustrating a modified example of the pneumatic tire illustrated in FIG. 1.

For example, the electrically conductive portion 52 of the configuration illustrated in FIGS. 13 to 15 is disposed on the tire cavity side of the innerliner 18 and tie rubber 19 and is exposed to the tire inner circumferential surface. The electrically conductive portion 52 extends along the surface of the innerliner 18 from the bead portion to the belt layer 14.

In the configuration illustrated in FIG. 13 and FIG. 14, the radially inward end portion of the electrically conductive portion 52 extends with the innerliner 18 and the tie rubber 19 to the lower portion of the rim cushion rubber 17 and is disposed between the rim cushion rubber 17 and the carcass layer 13. In addition, by the electrically conductive portion 52 being in contact with the rim cushion rubber 17, electrical conductivity from the rim fitting surface to the electrically conductive portion 52 is increased. In such a case, the radially inward end portion of the electrically conductive portion 52 may be located inward of the bead core 11 or the bead filler 12 in the tire width direction (see FIG. 13). The radially inward end portion of the electrically conductive portion 52 may be located inward of the bead core 11 in the radial direction (not illustrated). Additionally, the radially inward end portion of the electrically conductive portion 52 may wind up and around the bead core 11 conforming with the carcass layer 13 (see FIG. 14).

In the configuration illustrated in FIG. 15, the radially inward end portion of the electrically conductive portion 52 extends to the inner side of the bead core 11 in the radial direction along the circumferential surface of the rim cushion rubber 17 and is exposed to the rim fitting surface. Such a configuration is preferable because, with the tire mounted on the rim, the electrically conductive portion 52 is in direct contact with the rim R, and thus electrical conductivity from the rim R to the electrically conductive portion 52 is improved.

Figure 16:
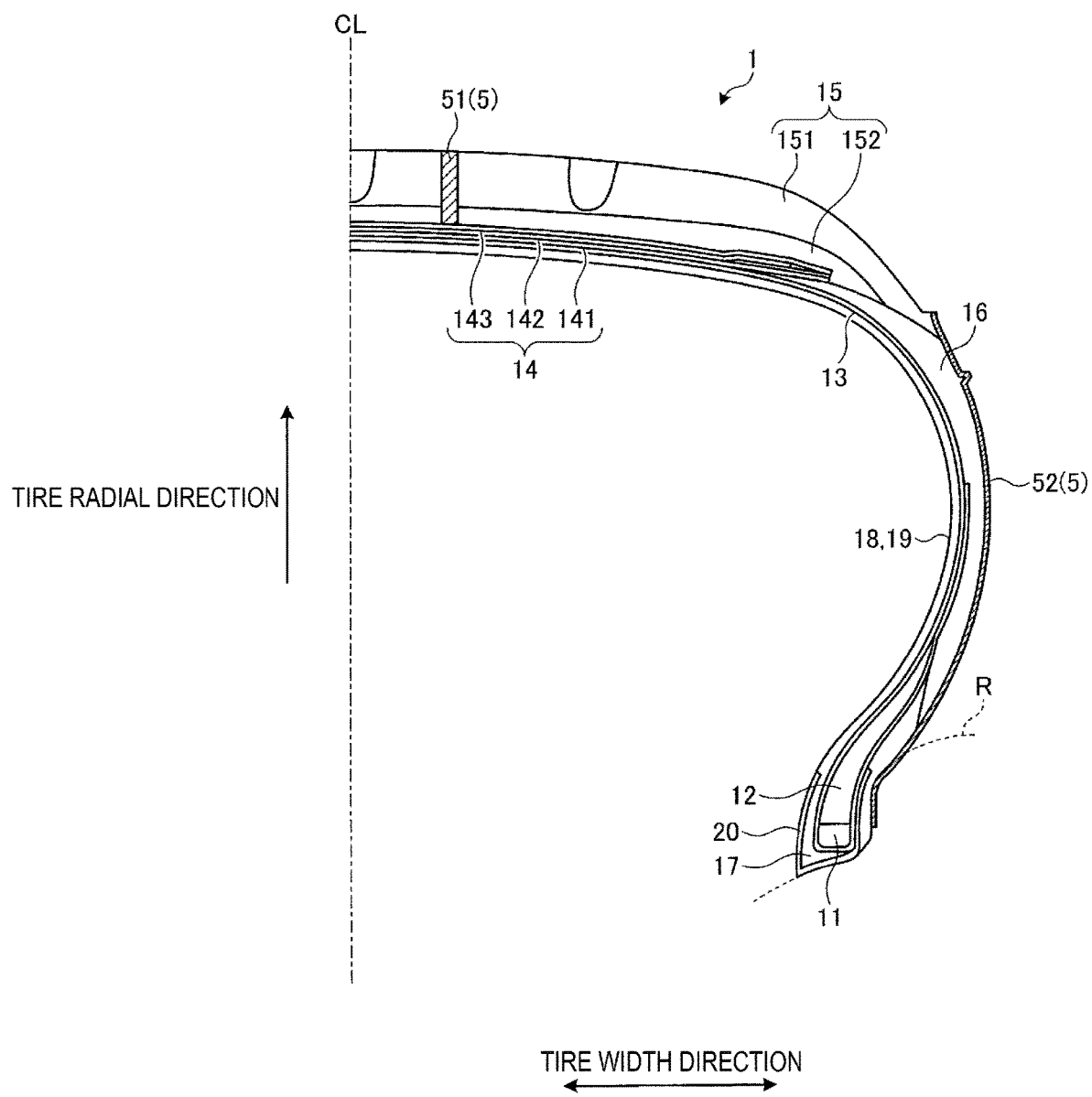
FIG. 16 is an explanatory diagram illustrating a modified example of the pneumatic tire illustrated in FIG. 1.

Additionally, for example, the electrically conductive portion 52 of the configuration illustrated in FIG. 16 is disposed on the outer circumference of the sidewall rubber 16 and is exposed to the tire outer circumferential surface. The electrically conductive portion 52 extends along the surface of the sidewall rubber 16 from the bead portion to the tread rubber 15.

Figure 17:
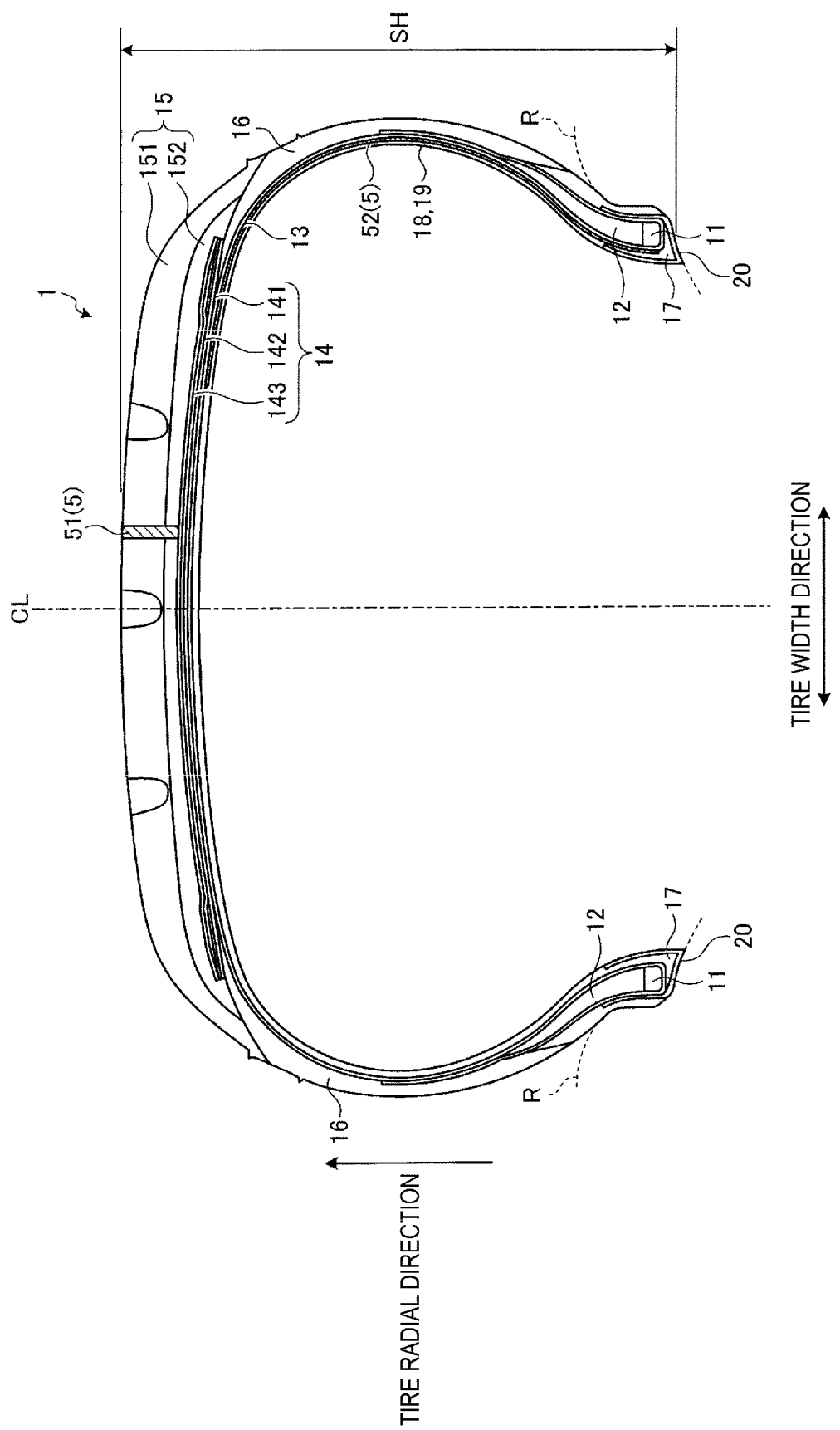
FIG. 17 is an explanatory diagram illustrating a modified example of the pneumatic tire illustrated in FIG. 1.
Figure 18:
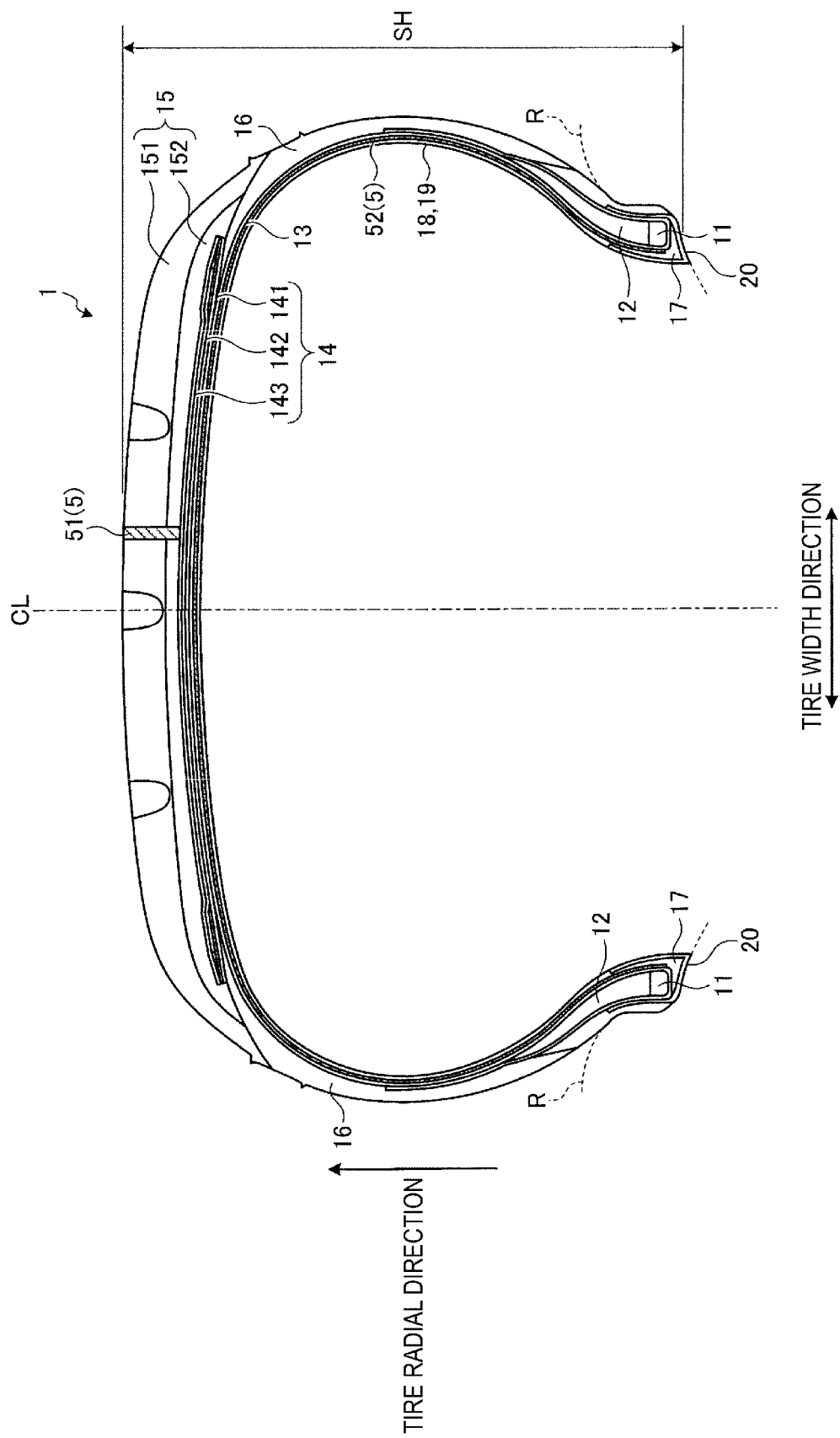
FIG. 18 is an explanatory diagram illustrating a modified example of the pneumatic tire illustrated in FIG. 1.

FIG. 17 and FIG. 18 are explanatory diagrams illustrating modified examples for the pneumatic tire illustrated in FIG. 1. These diagrams illustrate modified examples of the structure with which the electrically conductive portion 52 is disposed.

The electrically conductive portion 52 of the configuration illustrated in FIG. 1 is disposed in each of the regions to the left and the right of the tire equatorial plane CL. In addition, the radially outward end portion of the electrically conductive portion 52 extends from the bead portion to a position at which the end portion overlaps the belt layer 14 and ends without crossing the tire equatorial plane CL.

In contrast, as illustrated in FIG. 17, the electrically conductive portion 52 may be disposed in the region to only one side of the tire equatorial plane CL. The electrically conductive portion 52 may alternatively be disposed across the entire width of the tire width direction, as illustrated in FIG. 18.

Figure 19:
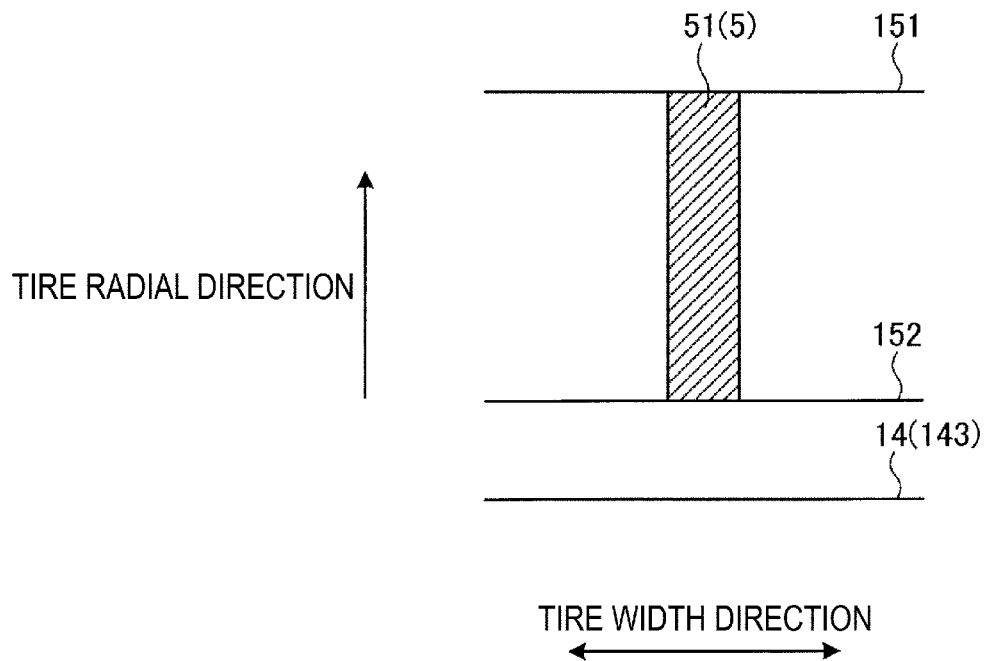
FIG. 19 is an explanatory diagram illustrating a modified example of the pneumatic tire illustrated in FIG. 1.
Figure 20:
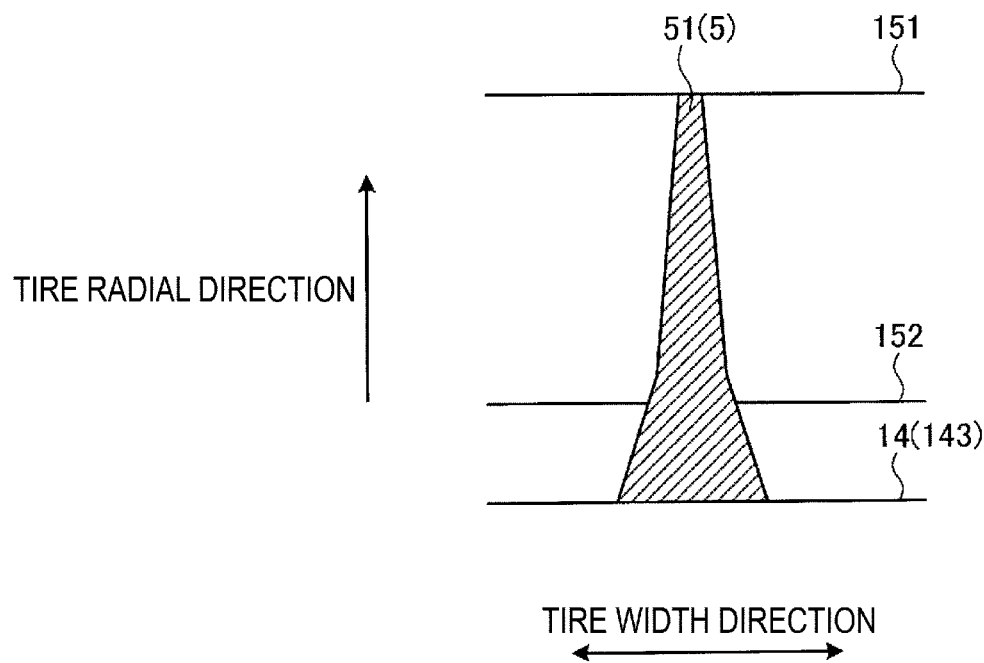
FIG. 20 is an explanatory diagram illustrating a modified example of the pneumatic tire illustrated in FIG. 1.

FIG. 19 and FIG. 20 are explanatory diagrams illustrating modified examples for the pneumatic tire illustrated in FIG. 1. These diagrams illustrate enlarged cross-sectional views of the earthing tread 51.

As illustrated in FIG. 3, the earthing tread 51 of the configuration illustrated in FIG. 1, when viewed as a cross-section from the tire meridian direction, is disposed passing through the tread cap 151 and undertread 152, is exposed to the road contact surface of the tread rubber 15, and is in contact with the belt layer 14 (the belt cover 143, which is the outermost layer) in an electrically conductive manner. The earthing tread 51 has a straight shape. Such a configuration is preferable because the effects of electrostatic suppression can be efficiently obtained by an electrically conductive path being ensured from the belt layer 14, which has a low resistivity, to the road contact surface of the tread rubber 15, via the earthing tread 51.

In contrast to the configuration illustrated in FIG. 3, the earthing tread 51 of the configuration illustrated in FIG. 19 is disposed passing through the tread cap 151 only and is in contact with the undertread 152. Such a configuration can efficiently obtain effects of electrostatic suppression by the undertread 152 having a low resistivity.

In relation to the configuration illustrated in FIG. 3, the earthing tread 51 of the configuration illustrated in FIG. 20 has a shape which widens from the road contact surface of the tread rubber 15 toward the belt layer 14 to increase the contact surface with the belt layer 14. Such a configuration can suppress the amount of area of the earthing tread 51 exposed to the tread road contact surface while reliably ensuring greater contact area between the earthing tread 51 and the belt layer 14 than the configuration in which the earthing tread 51 has a straight shape (see FIG. 3). Thus, the electrical conductivity from the belt layer 14 to the earthing tread 51 is improved.

Note that in FIG. 3, FIG. 19, and FIG. 20, the earthing tread 51 is employed as a discharge structure spanning from the belt layer 14 (or the undertread 152) to the road contact surface of the tread rubber 15. However, the discharge structure is not limited to this earthing tread 51 and other known discharge structures may be employed.

EFFECT

As described above, the pneumatic tire 1 is provided with the pair of bead cores 11, 11, the at least one carcass layer 13 extending between the pair of bead cores 11, 11 continuously or with a divided portion at the tread portion, the belt layer 14 disposed outward of the carcass layer 13 in the tire radial direction, the tread rubber 15 disposed outward of the belt layer 14 in the tire radial direction, the pair of sidewall rubbers 16, 16 disposed outward of the carcass layer 13 in the tire width direction on both sides, and the innerliner 18 disposed on the inner circumferential surface of the carcass layer 13 (see FIG. 1). The pneumatic tire 1 is also provided with the electrically conductive portion 52 at least extending continuously from the bead portion to the belt layer 14 (see FIG. 2). The electrically conductive portion 52 has a linear structure. The linear structure includes the electrically conductive linear member linearly formed of electrically conductive material with an electrical line resistivity of less than $1\times10^8$ Ω/cm (see FIGS. 4 to 6). Such a configuration:

(1) is advantageous because the electrically conductive portion 52 ensures that an electrically conductive path from the bead portion to the belt layer 14 is formed, and thus the electrostatic suppression performance of the tire is effectively improved; and (2) is advantageous because by the electrically conductive linear member 521 of the electrically conductive portion 52 being linearly formed of electrically conductive material with an electrical line resistivity of less than $1\times10^8$ Ω/cm, a reduction in electrical conductivity of the electrically conductive portion 52 caused when the tire is manufactured or in service is suppressed. Consequently, electrostatic suppression performance of the tire is appropriately ensured. A configuration, for example, in which the electrically conductive portion is a non-electrically conductive linear member coated with electrically conductive material is not preferable because the coating is susceptible to separation due to heat or strain that occurs when the tire is manufactured or in service, and thus the electrical conductivity of the electrically conductive portion may be reduced. In particular, in the case of a configuration in which the innerliner 18 is made of thermoplastic resin or a thermoplastic elastomer composition made by blending an elastomer component with a thermoplastic resin, the thin gauge of the innerliner 18 causes the electrically conductive portion 52 (for example, see FIG. 2, FIG. 9, and the like) embedded in the tire to reach high temperatures. Thus, configurations in which the electrically conductive portion is a non-electrically conductive linear member coated with electrically conductive material are not preferable especially because the coating is susceptible to separation.

The electrically conductive portion 52 of the pneumatic tire 1 includes a plurality of intertwined linear members, the plurality of linear members including at least one electrically conductive linear member 521 (see FIG. 6). Such a configuration is advantageous because, by the electrically conductive portion 52 having a stranded wire structure, repeated fatigue properties and elongation properties are more favorable than those of configurations in which the electrically conductive portion is a monofilament, and thus the durability of the electrically conductive linear member 521 is improved.

In addition, the electrically conductive portion 52 of the pneumatic tire 1 includes the electrically conductive linear member 521 with an electrical line resistivity of less than $1\times10^8$ Ω/cm and the non-electrically conductive linear member 522 with an electrical line resistivity of $1\times10^8$ Ω/cm or greater intertwined together (see FIG. 6). This configuration is advantageous because the non-electrically conductive linear member 522 can, for example, compensate for the insufficiencies of the electrically conductive linear member 521, and thus the strength, heat resistance, and dimensional stability of the electrically conductive portion 52 can be appropriately ensured.

The electrically conductive linear member 521 of the pneumatic tire 1 is a metal fiber (in particular, stainless steel fiber), and the non-electrically conductive linear member 522 is an organic fiber (in particular, polyester fiber) (see FIG. 6). This configuration is advantageous because strength, heat resistance, and dimensional stability can be appropriately ensured.

The electrically conductive linear member 521 of the pneumatic tire 1 includes a plurality of carbon fibers intertwined together. This configuration is advantageous because reduction in weight can be achieved.

In addition, the electrically conductive linear member 521 of the pneumatic tire 1 is a monofilament cord made of carbon fiber. This configuration is advantageous because reduction in weight can be achieved.

The electrically conductive portion 52 of the pneumatic tire 1 is disposed between the carcass layer 13 and the adjacent member (examples include in FIGS. 2 and 4, the innerliner 18 and the tie rubber 19, and in FIG. 9, the belt layer 14 and the sidewall rubber 16). Such a configuration is advantageous because, by the electrically conductive portion 52 being embedded in the tire, the electrically conductive portion can be prevented from breaking upon the manufacture of the tire or when in service to a greater degree than a configuration in which the electrically conductive portion is exposed to the tire surface.

In the pneumatic tire 1, the cord rubber of the carcass layer 13 has a volume resistivity of $1 \times 10^8$ Ω·cm or greater. Such a configuration is advantageous because, by being able to reduce the amount of carbon blended in the cord rubber, the release of heat from the cord rubber when the tire is driven can be suppressed, and thus the tire rolling resistance can be reduced.

The innerliner 18 of the pneumatic tire 1 is constituted by a thermoplastic resin or a thermoplastic elastomer composition made by blending an elastomer component with a thermoplastic resin. Such a configuration is advantageous because air permeability of the innerliner 18 can be more favorably reduced than a configuration in which butyl rubber constitutes the innerliner 18, and thus tire weight and tire rolling resistance are reduced. In the pneumatic tire 1, the distance from the innerliner 18 to the electrically conductive portion 52 is 1.0 mm or less (see FIG. 4). Such a configuration is advantageous because with a configuration in which the innerliner 18 is constituted by a thermoplastic resin, static electricity produced in the innerliner 18 can efficiently dissipate through the electrically conductive portion 52.

In the pneumatic tire 1, the total linear density of the electrically conductive portion 52 is from 20 to 1000 dtex, both inclusive. This configuration is advantageous because the total linear density of the electrically conductive portion 52 is made appropriate. In other words, when the total linear density is 20 dtex or greater, breaking of the electrically conductive portion 52 upon manufacture of the tire is prevented. When the total linear density is 1000 dtex or less, breaking of the electrically conductive portion 52 when the tire is driven is prevented.

In addition, the electrically conductive portion 52 of the pneumatic tire 1 has an elongation ratio of from 1.0 to 70.0%, both inclusive. This configuration is advantageous because the elongation ratio of the electrically conductive portion 52 is made appropriate. In other words, because the elongation ratio is 1.0% or greater, breaking of the electrically conductive portion 52 upon manufacture of the tire is prevented. Because the elongation ratio is 70.0% or less, breaking of the electrically conductive portion 52 when the tire is driven is prevented.

The tread rubber 15 of the pneumatic tire 1 includes the tread cap 151 constituting the ground contact surface, and the undertread 152 layered inward of the tread cap 151 in the tire radial direction (see FIG. 1). The tread cap 151 has a value of tan δ at 60° C. of 0.25 or less and a volume resistivity of $1 \times 10^8$ Ω·cm or greater. Such a configuration is advantageous because the tire rolling resistance is reduced when the amount of silica contained in the tread cap 151 is increased.

The tread rubber 15 of the pneumatic tire 1 includes the tread cap 151 constituting the ground contact surface, and the undertread 152 disposed inward of the tread cap 151 in the tire radial direction. The tread rubber 15 has an volume resistivity of less than $1 \times 10^8$ Ω·cm and is provided with the earthing tread 51 that passes through at least the tread cap 151 and is exposed to the ground contact surface (see FIGS. 1 to 3). Such a configuration is advantageous because an electrically conductive path from the belt layer 14 (or the undertread 152) to the contact surface of the tread rubber 15 is ensured.

In the pneumatic tire 1, the value of tan δ at 60° C. of the sidewall rubber 16 is 0.20 or less, and the volume resistivity of the sidewall rubber 16 is $1 \times 10^8$ Ω·cm or greater. Such a configuration is advantageous because the tire rolling resistance is reduced when the amount of silica contained in the sidewall rubber 16 is increased.

EXAMPLES

FIGS. 21A-21B include a table showing results of performance testing of pneumatic tires according to embodiments of the present technology.

In the performance testing, a plurality of mutually differing test tires were evaluated for (1) low rolling resistance and (2) electrostatic suppression performance (electrical resistance value). For the performance testing, test tires of tire size 195/65R15 91H were manufactured.

(1) For the evaluation for low rolling resistance, the tire rolling resistance was measured using an indoor drum type tire rolling resistance tester with a drum diameter of 1707 mm in accordance with the measurement method defined in JATMA Y/B 2012 edition. Results of the evaluations were indexed with the results of the Conventional Example set as the reference (100). Higher values indicate lower rolling resistance (preferred result).

(2) For the evaluation of electrostatic suppression performance, electrical resistance (Ω) was measured using ADVANTEST R8340A ultra high resistance meter in accordance with measurement conditions specified by JATMA. The electrical resistance was measured when the tires were new and after travelling under predetermined conditions. The electrical resistance after travelling was measured as follows:

the test tires were assembled on an applicable rim as specified by JATMA, inflated to an air pressure of 200 kPa, loaded with 80% of a maximum load as specified by JATMA, and run for 60 min at 81 km/h using an indoor drum type tire rolling resistance tester with a drum diameter of 1707 mm. Lower values indicate superior discharge properties (preferred result).

The test tires of Working Examples 1 to 10 had a configuration based on that illustrated in FIG. 1 and were provided with the earthing tread 51 and the electrically conductive portion 52 including the electrically conductive linear member. The electrically conductive portion 52 was disposed at different positions: between the carcass layer 13 and the innerliner 18 and tie rubber 19 (FIG. 2), between the carcass layer 13 and the belt layer 14 and sidewall rubber 16 (FIG. 9), and on the surface of the sidewall portion (FIG. 16). In addition, the electrically conductive portion 52 was either a "blended yarn" made of intertwined polyester fiber and stainless steel fiber, or "carbon fiber" made of intertwined carbon fibers. "Electrical line resistivity of electrically conductive portion (Ω/cm)" refers to the electrical resistivity of the electrically conductive portion 52, which is a stranded wire.

The test tire of the Conventional Example was the same as that of Working Example 2 except that the electrically conductive portion 52 was made of polyester fiber, which is a non-electrically conductive material, coated with a conducting polymer.

As shown in the test results, it can be seen that the low rolling resistance and electrostatic suppression performance of the test tires of Working Examples 1 to 10 are improved.

The invention claimed is:

1. A pneumatic tire, comprising:
a pair of bead cores;
at least one carcass layer extending between the pair of bead cores continuously or with a divided portion at a tread portion;
a belt layer disposed outward of the carcass layer in a tire radial direction;
a tread rubber disposed outward of the belt layer in the tire radial direction;
a pair of sidewall rubbers disposed outward of the carcass layer in a tire width direction;
a rim cushion rubber;
an innerliner disposed on an inner circumferential surface of the carcass layer; and
an electrically conductive portion extending continuously at least from a bead portion to the belt layer; wherein
the electrically conductive portion has a linear structure and a total linear density from 200 to 1000 dtex, both inclusive, the linear structure including an electrically conductive linear member made of a linear electrically conductive material with an electric line resistivity of less than $1\times10^8$ $\Omega$/cm;
the electrically conductive portion is disposed between an inner circumferential surface of the carcass layer and an adjacent member;
a radially outward end portion of the electrically conductive portion extends to a position at which an end portion overlaps the belt layer and ends without crossing a tire equatorial plane;
a lap width with which the belt layer and the electrically conductive portion overlap is 3 mm or greater;
a radially inward end portion of the electrically conductive portion contacts the rim cushion rubber; and
the rim cushion rubber has a resistivity of $1\times10^7$ $\Omega\cdot$cm or less.

2. The pneumatic tire according to claim 1, wherein the electrically conductive portion includes an intertwined plurality of linear members, the plurality of linear members including at least one electrically conductive linear member.

3. The pneumatic tire according to claim 1, wherein the electrically conductive portion includes the electrically conductive linear member with an electric line resistivity of less than $1\times10^8$ $\Omega$/cm and a non-electrically conductive linear member with an electrical line resistivity of $1\times10^8$ $\Omega$/cm or greater intertwined together.

4. The pneumatic tire according to claim 3, wherein the electrically conductive linear member is a metal fiber, and the non-electrically conductive linear member is an organic fiber.

5. The pneumatic tire according to claim 1, wherein the electrically conductive linear member is made of a plurality of carbon fibers intertwined together.

6. The pneumatic tire according to claim 1, wherein the electrically conductive linear member is a monofilament cord made of carbon fiber.

7. The pneumatic tire according to claim 1, wherein a coating rubber of the carcass layer has a volume resistivity of $1\times10^8$ $\Omega\cdot$cm or greater.

8. The pneumatic tire according to claim 1, wherein the innerliner is constituted by a thermoplastic resin or a thermoplastic elastomer composition made by blending an elastomer component with a thermoplastic resin.

9. The pneumatic tire according to claim 8, wherein a distance from the innerliner to the electrically conductive portion is 1.0 mm or less.

10. The pneumatic tire according to claim 1, wherein the electrically conductive portion has an elongation ratio from 1.0 to 70.0%, both inclusive.

11. The pneumatic tire according to claim 1, wherein
the tread rubber includes a tread cap constituting a ground contact surface, and an undertread disposed inward of the tread cap in the tire radial direction;
the tread cap has a value of tan $\delta$ at 60° C. of 0.25 or less; and
the tread cap has a volume resistivity from $1\times10^8$ $\Omega\cdot$cm or greater.

12. The pneumatic tire according to claim 1, wherein
the tread rubber includes a tread cap constituting a ground contact surface, and an undertread disposed inward of the tread cap in the tire radial direction; and further comprising
an earthing tread that passes through at least the tread cap and is exposed to the ground contact surface, the earthing tread having a volume resistivity of less than $1\times10^8$ $\Omega\cdot$cm.

13. The pneumatic tire according to claim 1, wherein the sidewall rubber has a value of tan $\delta$ at 60° C. of 0.20 or less and a volume resistivity of $1\times10^8$ $\Omega\cdot$cm or greater.

14. The pneumatic tire according to claim 1, wherein the electrically conductive portion terminates at the belt layer.

15. The pneumatic tire according to claim 1, wherein the electrically conductive linear member has the electric line resistivity of from greater than $1\times10^6$ $\Omega$/cm to less than $1\times10^8$ $\Omega$/cm.

16. The pneumatic tire according to claim 1, wherein the conductive portion does not turn up around the bead core.

17. The pneumatic tire according to claim 1, wherein the radially inward end portion of the electrically conductive portion extends to an outer side in the tire width direction from a center of gravity of the bead core.

18. A pneumatic tire, comprising:
a pair of bead cores;
at least one carcass layer extending between the pair of bead cores continuously or with a divided portion at a tread portion;
a belt layer disposed outward of the carcass layer in a tire radial direction;
a tread rubber disposed outward of the belt layer in the tire radial direction;
a pair of sidewall rubbers disposed outward of the carcass layer in a tire width direction;
an innerliner disposed on an inner circumferential surface of the carcass layer; and
an electrically conductive portion extending continuously at least from a bead portion to the belt layer; wherein
the electrically conductive portion has a linear structure and a total linear density from 200 to 1000 dtex, both inclusive, the linear structure including an electrically conductive linear member made of a linear electrically conductive material with an electric line resistivity of less than $1\times10^8$ $\Omega$/cm;
the electrically conductive portion is disposed between an outer circumferential surface of the carcass layer and an adjacent member;

a radially outward end portion of the electrically conductive portion extends to a position at which an end portion overlaps the belt layer and ends without crossing a tire equatorial plane; and a lap width with which the belt layer and the electrically conductive portion overlap is 3 mm or greater.

19. The pneumatic tire according to claim 18, wherein:

an end of the carcass layer is folded outwardly in the tire width direction so as to wrap around the bead cores, and fixed; and the electrically conductive portion is disposed along an outer circumferential surface of a main body of the carcass layer and extends to the bead portion, and is disposed between the outer circumferential surface of the main body and the end of the carcass layer.

20. The pneumatic tire according to claim 18, wherein a folded end of the carcass layer extends to a tire maximum width position.

\* \* \* \* \*